(12) United States Patent
Fujimori

(10) Patent No.: US 9,115,269 B2
(45) Date of Patent: Aug. 25, 2015

(54) FLAME RETARDANT POLYCARBONATE RESIN COMPOSITION, FLAME RETARDANT FOR POLYCARBONATE RESIN, AND METHOD FOR PRODUCING SAME

(75) Inventor: Takayasu Fujimori, Kanagawa (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 113 days.

(21) Appl. No.: 13/988,424

(22) PCT Filed: Nov. 28, 2011

(86) PCT No.: PCT/JP2011/077469
§ 371 (c)(1),
(2), (4) Date: May 20, 2013

(87) PCT Pub. No.: WO2012/081391
PCT Pub. Date: Jun. 21, 2012

(65) Prior Publication Data
US 2013/0267634 A1 Oct. 10, 2013

(30) Foreign Application Priority Data

| Dec. 16, 2010 | (JP) | 2010-280108 |
| Dec. 16, 2010 | (JP) | 2010-280110 |
| May 26, 2011 | (JP) | 2011-117760 |
| May 26, 2011 | (JP) | 2011-117767 |
| Jul. 26, 2011 | (JP) | 2011-162697 |
| Jul. 26, 2011 | (JP) | 2011-162699 |
| Sep. 26, 2011 | (JP) | 2011-209319 |

(51) Int. Cl.
*C08K 5/42* (2006.01)
*C08K 5/159* (2006.01)
*C08K 7/14* (2006.01)
*C08L 69/00* (2006.01)
*C08L 27/18* (2006.01)
*C08L 55/02* (2006.01)

(52) U.S. Cl.
CPC . *C08K 5/42* (2013.01); *C08K 5/159* (2013.01); *C08L 69/00* (2013.01); *C08K 7/14* (2013.01); *C08L 27/18* (2013.01); *C08L 55/02* (2013.01)

(58) Field of Classification Search
CPC ............ C08K 5/42; C08K 5/159; C08K 7/14; C08L 69/00; C08L 27/18; C08L 55/02
USPC .................................. 524/156, 165, 166, 495
See application file for complete search history.

(56) References Cited

U.S. PATENT DOCUMENTS 3,775,367 A   11/1973   Nouvertne

FOREIGN PATENT DOCUMENTS

| JP | 47 40445 | 10/1972 |
| JP | 54 32456 | 10/1979 |
| JP | 62 246568 | 10/1987 |
| JP | 8 311320 | 11/1996 |
| JP | 2000 169696 | 6/2000 |
| JP | 2001 131553 | 5/2001 |
| JP | 2001 181493 | 7/2001 |
| JP | 2007 197584 | 8/2007 |

OTHER PUBLICATIONS

International Search Report Issued Dec. 27, 2011 in PCT/JP11/77469 Filed Nov. 29, 2011.

*Primary Examiner* — Kriellion Sanders
(74) *Attorney, Agent, or Firm* — Oblon, McClelland, Maier & Neustadt, L.L.P.

(57) ABSTRACT

The present invention discloses a polycarbonate resin composition and molded article thereof with excellent flame resistance, no problem with clouding, and excellent haze properties and color tone values. The flame retardant polycarbonate resin composition wherein (B) a metal salt of an organic sulfonic acid and (C) a compound with inclusion capability are contained in (A) a polycarbonate resin, and a flame retardant for a polycarbonate resin comprising an inclusion compound in which (B) a metal salt of an organic sulfonic acid is enclosed by (C) a compound with inclusion capability.

19 Claims, No Drawings

FLAME RETARDANT POLYCARBONATE RESIN COMPOSITION, FLAME RETARDANT FOR POLYCARBONATE RESIN, AND METHOD FOR PRODUCING SAME

This application is a 371 of PCT/JP11/77469, filed Nov. 29, 2011. Priority to Japanese patent application Nos. 2010-280110, filed Dec. 16, 2010; 2010-162699, filed Jul. 26, 2011; 2011-209319, filed Sep. 26, 2011; 2010-280108, filed Dec. 16, 2010; 2011-162697, filed Jul. 26, 2011; 2011-117767, filed May 26, 2011; and 2011-117760, filed May 26, 2011, are claimed.

TECHNICAL FIELD

The present invention relates to a flame retardant polycarbonate resin composition, a flame retardant for a polycarbonate resin, and a process for producing the same. More particularly, it relates to a flame retardant polycarbonate resin composition having excellent flame resistance without the loss of the excellent mechanical properties of polycarbonate resins such as impact resistance and having excellent haze properties and color tone values without the problem of clouding in a molded article thereof; a flame retardant having excellent flame resistance and excellent compatibility with a polycarbonate resin and providing a polycarbonate resin composition having excellent haze properties and color tone values without the problem of clouding in a molded article thereof; and a process for producing the same.

BACKGROUND ART

Polycarbonate resins have excellent heat resistance, mechanical properties, and electrical properties, and they are widely used, for example, in materials for automobiles, materials for electrical and electronic equipment, housing materials, and materials for the manufacture of parts in other fields of industry. In particular, polycarbonate resin compositions imparted with flame resistance are most suitably used as materials for manufacturing computers, notebook type personal computers, cell phones, portable terminals, printers, copiers, and other office automation and data processing equipment.

In the past, halogen-based flame retardants and phosphorus-based flame retardants have been blended into polycarbonate resins as methods of imparting flame resistance thereto.

However, polycarbonate resin compositions containing halogen-based flame retardants, which comprise chlorine and bromine, tend to have problems such as a decrease in thermostability, corrosion of the forming molds and screws of the molding machines during the molding process, and the like. Moreover, polycarbonate resin compositions containing phosphorus-based flame retardants tend to have problems such as interference with the high level of transparency that is the hallmark of polycarbonate resins, as well as a decrease in impact resistance and thermostability, so their use therein is limited. In addition, because halogen-based flame retardants and phosphorus-based flame retardants can cause environmental pollution when the manufactured products are discarded and collected, recently it has become desirable to impart flame resistance without using these kinds of flame retardants.

Under such circumstances, a large number of metal salt compounds typified by alkali metal salts of organic acids and alkaline earth metal salts of organic acids are being investigated as useful flame retardants. When an organometallic salt compound is used as a flame retardant, efficacy can be obtained with a relatively small amount thereof, and flame resistance can be imparted without a loss of the intrinsic properties of polycarbonate resins such as impact resistance and other mechanical properties, heat resistance, and electrical properties.

As techniques for imparting flame resistance to a polycarbonate resin using a metal salt compound, for example, methods have been proposed wherein flame resistance is imparted to an aromatic polycarbonate resin using an alkali metal salt compound of a perfluoroalkane sulfonic acid such as the method using an alkali metal salt of a $C_{4-8}$ perfluoroalkyl sulfonic acid (see Patent literature 1), and the method of including therein an alkali metal salt of a $C_{1-3}$ perfloroalkane sulfonic acid (see Patent literature 2); and methods have been proposed wherein flame resistance is imparted to a polycarbonate resin composition using an alkali metal salt of an aromatic sulfonic acid such as the method of including therein a sodium salt of a halogen free aromatic sulfonic acid (see Patent literature 3), and the method of including therein a potassium salt of a halogen free aromatic sulfonic acid (see Patent literature 4).

These metal salt-based flame retardant compounds have relatively good compatibility with the polycarbonate resin and flame retardant properties, and they have few adverse effects on the hue of the polycarbonate resin. Therefore, although they are excellent flame retardants and a level of compatibility that does not cause problems from a practical standpoint, these compounds (more specifically, the use of a compound such as potassium nonafluorobutane sulfonate, sodium nonafluorobutane sulfonate, and potassium diphenylsulfone sulfonate is particularly preferred) are essentially hydrophilic and do not have good compatibility with polycarbonate resins.

Although flame resistance may be high, when compatibility with the polycarbonate resin is low, the amount of haze increases, which imposes the limitation that these flame retardants cannot be used in fields requiring high transparency and in products requiring an upscale image with no clouding. For example, because trifluoro methanesulfonates have a short molecular chain, they have better flame resistance than other metal salts, but they are difficult to use because the haze value becomes too large.

Moreover, if an attempt is made to add more metal salt-based flame retardant to increase flame resistance, deterioration in the haze value becomes too conspicuous beyond a certain level, and the content cannot be increased any farther. In addition, increasing the amount of flame retardant tends to have an adverse effect on the hue of the polycarbonate resin composition, which is also undesirable.

For example, for a transparent, flame retardant polycarbonate resin composition, about 0.08-0.1 mass % of potassium nonafluorobutane sulfonate may be added to prevent color tone deterioration and assure transparency. Even in such cases, however, the hydrophilic potassium nonafluorobutane sulfonate coagulates and causes clouding in the thicker sections that cool slowly during injection molding, so the use thereof is limited in products that have thick sections.

Moreover, when a metal salt-based flame retardant is added to a glass fiber-reinforced polycarbonate resin material wherein glass fibers have been mixed into the polycarbonate resin to further increase strength, there is a problem in that the strength and rigidity of the polycarbonate resin decrease.

In addition, when a metal salt-based flame retardant is added to a polycarbonate resin material wherein an elastomer has been mixed into the polycarbonate resin to impart a high level of impact resistance, there is a problem in that the polycarbonate resin or the elastomer will tend to yellow easily, and the color tone will deteriorate.

CITATION LIST

Patent Literature

Patent Literature 1: Japanese Examined Patent Publication No. S47-40445
Patent Literature 2: Japanese Examined Patent Publication No. S54-32456
Patent Literature 3: Japanese Unexamined Patent Application Publication No. 2000-169696
Patent Literature 4: Japanese Unexamined Patent Application Publication No. 2001-181493

SUMMARY OF INVENTION

Technical Problem

Thus, imparting flame resistance through a metal salt compound cannot always be considered sufficient for the intended purpose, and particularly in products such as the kinds of polycarbonate resin molded articles with thicker sections and those that require a high level of transparency and an upscale image free of clouding, it can become fatal flaw.

With the foregoing problems in view, an object of the present invention is to provide polycarbonate resin composition having superb flame resistance, no problem of clouding in the molded article, and excellent haze properties and color tone values, as well as a flame retardant for a polycarbonate resin.

A further object of the present invention is to provide a polycarbonate resin composition with superb flame resistance and superb rigidity and strength even in a polycarbonate resin that is reinforced with glass fibers, and to provide a polycarbonate resin composition with superb flame resistance and color tone values, and superb impact resistance, even in a polycarbonate resin that contains an elastomer.

Solution to Problem

As a result of diligent and incisive research to address the above problems, the inventors discovered that a polycarbonate resin composition comprising a specific metal salt compound and a compound with inclusion capability is a polycarbonate resin composition having superb flame resistance, no problem of clouding, and excellent haze properties and color tone values. The inventors further discovered that an inclusion compound in which a specific metal salt compound is enclosed by a compound with inclusion capability is as a flame retardant that has superb compatibility with a polycarbonate resin, no clouding problem in a molded article, and excellent haze properties and color tone values, thereby completing the present invention.

Moreover, the inventors discovered that when the metal salt compound and compound with inclusion capability constitute a glass fiber-reinforced polycarbonate resin, a glass fiber-reinforced polycarbonate resin can be obtained wherein flame resistance, rigidity and strength are excellent, and they further discovered that when a core/shell elastomer is mixed into a polycarbonate resin and the metal salt compound and compound with inclusion capability are also included therein, a flame retardant polycarbonate resin can be obtained wherein dissociation of the polycarbonate resin and the elastomer is prevented, yellowing does not occur, the color tone is excellent, flame resistance is increased without a drop in burn resistance, and impact resistance is also excellent.

Hence, the present invention provides a flame retardant polycarbonate resin composition, a flame retardant for the polycarbonate resin, and a process for producing the same that are described below.

More specifically, the first aspect of the present invention provides a flame retardant polycarbonate resin composition, wherein (B) a metal salt of an organic sulfonic acid and (C) a compound with inclusion capability are contained in (A) a polycarbonate resin.

A second aspect of the present invention provides a flame retardant polycarbonate resin composition wherein, in the first aspect wherein at least one part of (C) the compound with inclusion capability encloses at least one part of (B) the metal salt of an organic sulfonic acid to form (D) an inclusion compound.

A third aspect of the present invention provides a flame retardant polycarbonate resin composition wherein, in the first aspect, the content of (B) the metal salt of an organic sulfonic acid and the content of (C) the compound with inclusion capability is each 0.01-2 parts by mass with respect to 100 parts by mass of (A) the polycarbonate resin.

A fourth aspect of the present invention provides a flame retardant polycarbonate resin composition wherein, in the first aspect, (B)/(C), which is a molar ratio of (B) the metal salt of an organic sulfonic acid to (C) the compound with inclusion capability, is 10/1-1/10.

A fifth aspect of the present invention provides a flame retardant polycarbonate resin composition wherein, in the first aspect, (C) the compound with inclusion capability is a crown ether compound.

A sixth aspect of the present invention provides a flame retardant polycarbonate resin composition wherein, in the fifth aspect, the crown ether compound is at least one type selected from the group consisting of 18-crown-6-ethers, dibenzo-18-crown-6-ethers, and 15-crown-5-ethers.

A seventh aspect of the present invention provides a flame retardant polycarbonate resin composition wherein, in the first aspect, (B) the metal salt of an organic sulfonic acid is an alkali metal salt of a perfluoroalkane sulfonic acid or an alkali metal salt of an aromatic sulfonic acid.

An eighth aspect of the invention provides a flame retardant polycarbonate resin composition wherein, in the first aspect, (B) the metal salt of an organic sulfonic acid and (C) the compound with inclusion capability are dissolved and mixed together in a solvent beforehand.

A ninth aspect of the present invention provides a flame retardant polycarbonate resin composition wherein, in the first aspect, (E) glass fibers are contained at 3-80 parts by mass with respect to 100 parts by mass of (A) the polycarbonate resin.

A tenth aspect of the present invention provides a flame retardant polycarbonate resin composition wherein, in the first aspect, (E) glass fibers are contained at 3-80 parts by mass and (G) a fluoropolymer is contained at 0.001-1 part by mass with respect to 100 parts by mass of (A) the polycarbonate resin.

An eleventh aspect of the present invention provides a flame retardant polycarbonate resin composition wherein, in the first aspect, (F) a core/shell elastomer and (G) a fluoropolymer are contained therein.

A twelfth aspect of the present invention provides a flame retardant polycarbonate resin composition wherein, in the first aspect, (A) the polycarbonate resin contains at least 20 mass % of a polycarbonate resin with a structural viscosity index N of no less than 1.2.

A thirteenth aspect of the present invention provides a flame retardant for a polycarbonate resin comprising an inclusion compound in which (B) a metal salt of an organic sulfonic acid is enclosed by (C) a compound with inclusion capability.

A fourteenth aspect of the present invention provides a flame retardant for a polycarbonate resin wherein, in the thirteenth aspect, (C) the compound with inclusion capability is a crown ether compound.

A fifteenth aspect of the present invention provides a flame retardant for a polycarbonate resin that, in the thirteenth aspect, is an inclusion compound obtained by enclosing (B) the organometallic metal salt of sulfonic acid in a crown ether compound.

A sixteenth aspect of the present invention provides a flame retardant for a polycarbonate resin wherein, in the fourteenth aspect, the crown ether compound is at least one type selected from 18-crown-6-ethers, dibenzo-18-crown-6-ethers, and 15-crown-5-ethers.

A seventeenth aspect of the present invention provides a process for producing the flame retardant for a polycarbonate resin of the fifteenth aspect wherein the inclusion compound is obtained by dissolving and mixing a metal salt of an organic sulfonic acid and a crown ether compound in a solvent.

Advantageous Effects of Invention

In the polycarbonate resin composition according to the present invention and molded article comprising the same, because the metal salt of an organic sulfonic acid forms an inclusion compound with the compound with inclusion capability, the metal salt of the organic sulfonic acid becomes oil-soluble and compatibility with the polycarbonate resin increases dramatically. Consequently, the problem of clouding can be eliminated. Moreover, ionization of the metal salt of the organic sulfonic acid is promoted by the formation of a complex structure thereby, and that enables effective flame resistance to be attained by adding an even smaller amount thereof.

Furthermore, in the flame retardant of the present invention, the metal salt of the organic sulfonic acid is made into an inclusion compound, and thus is rendered oil-soluble through the effect of the compound with inclusion capability such as the crown ether. Therefore, compatibility with the polycarbonate resin increases dramatically and consequently, the problem of clouding can be eliminated. Moreover, ionization of the metal salt of an organic sulfonic acid is promoted thereby, and that enables effective flame retardant attained by adding an even smaller amount thereof.

Therefore, the polycarbonate resin composition and flame retardant of the present invention enable a polycarbonate resin molded article to be obtained that has excellent flame resistance, no problem with clouding, and excellent haze properties and color tone values.

In addition, in the glass fiber reinforced polycarbonate resin composition, because the metal salt of an organic sulfonic acid forms an inclusion compound with the compound with inclusion capability, the metal salt of the organic sulfonic acid becomes oil soluble and compatibility with the polycarbonate resin increases dramatically. Moreover ionization of the metal salt of the organic sulfonic acid is promoted by the formation of a complex structure thereby, and that enables effective flame resistance to be attained by adding an even smaller amount thereof. This further enables a glass fiber-reinforced polycarbonate resin composition with excellent rigidity and strength to be provided wherein the decreases in rigidity and strength are reduced, and flame resistance is excellent.

In addition, in the polycarbonate resin composition containing a core/shell elastomer, because the metal salt of an organic sulfonic acid forms an inclusion compound with the compound with inclusion capability, the metal salt of an organic sulfonic acid becomes oil soluble and compatibility with the polycarbonate resin increases dramatically. Moreover, ionization of the metal salt of the organic sulfonic acid is promoted by the formation of a complex structure by the metal salt of an organic sulfonic acid, and that enables effective flame resistance to be attained by adding an even smaller amount thereof. This further enables a polycarbonate resin composition to be provided wherein the loss in color tone is reduced without causing dissociation of the polycarbonate resin or the core/shell elastomer, and additionally, flame resistance can be improved without a drop in burn resistance, and both color tone and impact resistance are excellent.

DESCRIPTION OF EMBODIMENTS

The present invention is described below through embodiments, examples, etc., but it is to be understood that the present invention is by no means limited to those embodiments, examples, etc., shown below.

Unless specifically stated otherwise, in the present description the symbol (–) is used inclusively, indicating that the preceding and following numerical values are included as lower and upper limits.

[1. Summary]

The polycarbonate resin composition of the present invention is characterized in that (B) a metal salt of an organic sulfonic acid and (C) a compound with inclusion capability are contained in (A) a polycarbonate resin, and the flame retardant for a polycarbonate resin of the present invention is characterized in that an inclusion compound in which (B) the metal salt of an organic sulfonic acid is enclosed by (C) a compound with inclusion capability.

[2. (A) Polycarbonate Resin]

Examples of (A) the polycarbonate resin, i.e., the resin material to be used in the present invention, include aromatic polycarbonate resins, aliphatic polycarbonate resins, and aromatic-aliphatic polycarbonate resins, but preferably an aromatic polycarbonate resin is used, and more specifically, a thermoplastic aromatic polycarbonate polymer or copolymer obtained by reacting an aromatic dihydroxy compound with phosgene or a diester of carbonic acid is used.

Examples of the aromatic dihydroxy compound include: 2,2-bis(4-hydroxyphenyl) propane (bisphenol A), 1,1-bis(4-hydroxyphenyl)ethane, bis(4-hydroxyphenyl) methane, 2,2-bis(4-hydroxyphenyl) butane, 2,2-bis(4-hydroxyphenyl)pentane, 2,2-bis(4-hydroxyphenyl)-4-methyl pentane, 2,2-bis(4-hydroxy-3-methylphenyl) propane, 2,2-bis(4-hydroxy-3-methoxyphenyl) propane, 2,2-bis(4-hydroxy-3,5-dimethylphenyl) propane, 2,2-bis(4-hydroxy-3-(1-methylethyl) phenyl) propane, 2,2-bis(4-hydroxy-3-tert-butylphenyl) propane, 2,2-bis(4-hydroxy-3-(1-methylpropyl) phenyl) propane, 2,2-bis(4-hydroxy-3-cyclohexylphenyl) propane, 2,2-bis(4-hydroxy-3-phenylphenyl) propane, 1,1-bis(4-hydroxyphenyl) decane, 1,1-bis(4-hydroxyphenyl)cyclohexane, 1,1-bis(4-hydroxyphenyl)-1-phenyl ethane, bis(4-hydroxyphenyl) phenyl methane, 1,1-bis(4-hydroxy-3-methylphenyl)cyclohexane, 1,1-bis(4-hydroxy-3,5-dimethylphenyl)cyclohexane, 1,1-bis(4-hydroxy-3-(1-methylethyl) phenyl)cyclohexane, 1,1-bis(4-hydroxy-3-tert-butylphenyl)cyclohexane, 1,1-bis(4-hydroxy-3-(1-methylpropyl) phenyl)cyclohexane, 1,1-bis(4-hydroxy-3-cyclohexylphenyl)cyclohexane, 1,1-bis(4-hydroxy-3-phenylphenyl)cyclohexane, 1,1-bis(4-hydroxy-3-methylphenyl)-1-phenyl ethane, 1,1-bis(4-hydroxy-3,5-dimethylphenyl)-1-phenyl ethane, 1,1-bis(4-hydroxy-3-(1-methylethyl) phenyl)-1-phenyl ethane, 1,1-bis(4-hydroxy-3-tert-butylphenyl)-1-phenyl ethane, 1,1-bis(4-hydroxy-3-(1-methylpropyl) phenyl)-1-phenyl ethane, 1,1-bis(4-hydroxy-3-cyclohexylphenyl)-1-phenyl ethane, 1,1-bis(4-hydroxy-3-phenylphenyl)-1-phenyl ethane, 1,1-bis(4-hydroxyphenyl) cyclopentane, 1,1-bis(4-hydroxyphenyl)cyclooctane, 4,4'-(1,3-phenylene diisopropylidene)bisphenol, 4,4'-(1,4-phenylene diisopropylidene)bisphenol, 9,9-bis(4-hydroxyphenyl) fluorene, 9,9-bis(4-hydroxy-3-methylphenyl) fluorene, 4,4'-dihydroxy benzophenone, 4,4'-dihydroxyphenyl ether, bis(4-hydroxyphenyl) sulfide, bis(4-hydroxyphenyl) sulfoxide, bis(4-hydroxyphenyl) sulfone, 4,4'-dihydroxybiphenyl, 1,1-bis(4-hydroxyphenyl)-3,3-5-trimethyl cyclohexane, 1,1-bis-(4-hydroxy-6-methyl-3-tert-butylphenyl) butane, hydroquinone, resorcinol, etc. Examples of aliphatic dihyoxy compounds include: tricyclo [5.2.1.0$^{2,6}$]decane dimethanol, 1,4-cyclohexane dimethanol, 1,3-cyclohexane dimethanol, 2,5-norbornane dimethanol, 2,6-norbornane dimethanol, trans-2,6-decalin dimethanol, 1,4-cyclohexane diol, 2,2,4,4-tetramethyl cyclopropane diol, 1,4-butane diol, 1,5-pentane diol, 3-methyl-1,5-pentane diol, 1,6-hexane diol, 1,7-heptane diol, 1,8-octane diol, 1,9-nonane diol, 1,10-decane diol, 1,11-undecane diol, 1,12-dodecanediol, etc. Moreover, as a part of the dihydroxy compounds, if either a compound in which at least 1 sulfonic acid tetraalkyl phosphonium is bonded to the above dihydroxy compound or a polymer or oligomer containing a phenolic OH group at each terminal and having a siloxane structure, etc., is used in combination therewith, a polycarbonate resin with a higher level of flame resistance can be obtained.

Preferred examples of (A) the polycarbonate resin to be used in the present invention include 2,2-bis(4-hydroxyphenyl) propane as the dihydroxy compound or a polycarbonate resin wherein 2,2-bis(4-hydroxyphenyl) propane is used in combination with another aromatic dihydroxy compound. Two or more types of polycarbonate resins can be used together as component (A) in the present invention.

The molecular weight of the polycarbonate resin to be used in the present invention is not limited, but the viscosity-average molecular weight converted from the solution viscosity when measured at a temperature of 25° C. using methylene chloride as a solvent is preferably 10,000-40,000, and more preferably 14,000-32,000. When the viscosity-average molecular weight falls within this range, the formability is good and a molded article with great mechanical strength can be obtained. The most preferred molecular weight range for the polycarbonate resin is 16,000-30,000.

The process for producing (A) the polycarbonate resin is not particularly limited herein, and a polycarbonate resin produced by either the phosgene method (interfacial polymerization) or the melt method (ester exchange method) can be used. In the case of a polycarbonate resin produced by the melt method, it is preferable to use a polycarbonate resin wherein a posttreatment has been performed to adjust the amount of terminal OH groups.

Component (A), the polycarbonate resin, in the present invention preferably contains at least fixed ratio of a polycarbonate resin wherein the structural viscosity index N lies within a specified range.

As described in detail in the document "Kagakusya no Tame no Rheology" [Rheology for Chemists] (Kagaku Dojin Publishing Co.) 1982, pages 15-16), the structural viscosity index N is an indicator for evaluating the flow characteristics of a molten body. Normally, the melt characteristics of a polycarbonate resin can be represented by the formula $\gamma = a \cdot \sigma^N$. In this formula, $\gamma$ is the shear rate, a is a constant, $\sigma$ is stress, and N is the structural viscosity index.

When N=1 in the above formula, it represents Newtonian fluid characteristics, but as the value of N increases, the non-Newtonian fluid characteristics increase. In other words, the fluid characteristics of a molten body are evaluated by the size of the structural viscosity index N. In general, a polycarbonate resin with a large structural viscosity index N tends to have higher melt viscosity in the low shear range. Therefore, when a polycarbonate resin with a large structural viscosity index N is mixed with a different polycarbonate resin, dripping during combustion of the resulting polycarbonate resin composition can be reduced, and the flame resistance can be improved. However, to retain the formability of the resulting polycarbonate resin composition in a satisfactory range, preferably the structural viscosity index N of this polycarbonate resin is not excessively large.

Therefore, (A) the polycarbonate resin in the polycarbonate resin composition of the present invention preferably comprises at least a fixed ratio of a polycarbonate resin, preferably an aromatic polycarbonate resin wherein the structural viscosity index N is normally 1.2 or higher, preferably 1.25 or higher, and more preferably 1.28 or higher, but normally 1.8 or lower, and preferably 1.7 or lower.

The fact that the structural viscosity index N is high in this manner means that the polycarbonate resin has branching chains, and by including a polycarbonate resin wherein the structural viscosity index N is high in this manner, dipping during combustion of the polycarbonate resin composition of the present invention can be reduced and flame resistance can be improved.

As disclosed in Japanese Unexamined Patent Application Publication No. 2005-232442, for example, the structural viscosity index N can be expressed by the formula, Log $\eta_a = [(1-N)/N] \times$ Log $\gamma + C$, derived from the formula noted above. In the formula, N is the structural viscosity index, $\gamma$ is the shear rate, C is a constant and $\eta_a$ is the apparent viscosity. As can be understood from this formula, the value of N can be evaluated from $\gamma$ and $\eta_a$ in the low shear region where the viscosity behavior can differ considerably. For example, the values for N can be determined from $\eta_a$ when $\gamma = 12.16$ sec$^{-1}$ and $\gamma = 24.32$ sec$^{-1}$.

In the case of an aromatic polycarbonate resin with a structural viscosity index N of 1.2 or higher, as disclosed, for example, in Japanese Unexamined Patent Application Publication No. 1996-259687 and Japanese Unexamined Patent Application Publication No. 1996-245782, when an aromatic dihydroxy compound and a diester of carbonic acid are reacted using the melt method (ester exchange method), an aromatic polycarbonate resin with a high structural viscosity index and excellent hydrolytic stability can be obtained without the addition of a branching agent by selecting the catalysis conditions or manufacturing conditions.

Moreover, an aromatic polycarbonate resin with a structural viscosity index N of 1.2 or higher can be produced by a method that uses a branching agent when an aromatic polycarbonate resin is manufactured in the normal way using the phosgene method or the melt method (ester exchange method).

Examples of the chain branching agent include: polyhydroxy compounds represented by phloroglucinol, 4,6-dimethyl-2,4,6-tris(4-hydroxyphenyl)heptene-2,4,6-dimethyl-2,4,6-tris(4-hydroxyphenyl) heptane, 2,6-dimethyl-2,4,6-tris (4-hydroxyphenyl) heptene-3,1,3,5-tris(4-hydroxyphenyl)

ethane or materials such as 3,3-bis(4-hydroxyaryl)oxyindole (=isatinbisphenol), 5-chloroisatinbisphenol, 5,7-dichloroisatinbisphenol, and 5-bromoisatinbisphenol.

The amount used lies in the range of 0.01-10 mol % with respect to the aromatic dihydroxy compound, and a range of 0.1-3 mol % is particularly preferred.

Preferably the molecular weight of the aromatic polycarbonate resin wherein the structural viscosity index N is 1.2 or higher, the viscosity-average molecular weight converted from the solution viscosity when measured at a temperature of 25° C. using methylene chloride as a solvent is 16,000-30,000.

It is desirable for (A) the polycarbonate resin in the polycarbonate resin composition of the present invention to normally constitute no less than 20 mass %, preferably no less than 50 mass %, and more preferably no less than 60 mass % of the polycarbonate resin described above wherein the structural viscosity index N lies within the specified range (hereinafter, this polycarbonate resin is also designated as "Specified N-polycarbonate resin"). Through making a combination with this kind of Specified N-polycarbonate resin, a decline in productivity and discoloration of the polycarbonate resin from shear heating are unlikely to occur since the torque during extrusion need not be increased unnecessarily.

There is no upper limit to the content of the Specified N-polycarbonate resin in the polycarbonate resin, and normally it will comprise no greater than 100 mass %, preferably no greater than 90 mass %, and more preferably no greater than 85 mass %.

Moreover, one type of Specified N-polycarbonate resin can be used alone, or desired combinations and proportions of two or more types thereof can be used together.

Moreover, in addition to the Specified N-polycarbonate resin described above, (A) the polycarbonate resin may contain a polycarbonate resin wherein the structural viscosity index N lies outside the above specified range. The type thereof is not limited, but a straight-chain polycarbonate resin is preferred. Combining the Specified N-polycarbonate resin and a straight-chain polycarbonate resin provides the benefit of more easily obtaining a balance between flame resistance (dripping prevention) and formability (fluidity) in the resulting polycarbonate resin composition. In this respect, it is particularly preferable to use (A) the polycarbonate resin that is composed of a Specified N-polycarbonate resin and a straight-chain polycarbonate resin. The structural viscosity index N of this straight-chain polycarbonate resin is normally about 1-1.15.

When (A) the polycarbonate resin contains a straight-chain polycarbonate resin, the ratio of the straight-chain polycarbonate resin in (A) the polycarbonate resin is normally no greater than 80 mass %, preferably no greater than 50 mass %, and more preferably no greater than 40 mass %, but usually greater than 0 mass %, preferably no less than 10 mass %, and more preferably no less than 15 mass %. Making the content of the straight-chain polycarbonate resin in the polycarbonate resin lie within the above range provides the benefits of more easily obtaining good dispersion of additives and more easily obtaining a polycarbonate resin with superb flame resistance and formability.

As (A) the polycarbonate resin, a polycarbonate resin alone can be used or an alloy (mixture) of a polycarbonate resin and a different thermoplastic resin can be used in combination (the term "polycarbonate resin alone" is used in the sense of including, for example, modes comprising a plurality of types of polycarbonate resins with different monomer compositions and molecular weights without being restricted to a mode comprising only one type of polycarbonate resin). In addition, (A) the polycarbonate resin may be composed of a copolymer having a polycarbonate resin as the main constituent, for example, a copolymer of a polycarbonate resin with an oligomer or polymer containing a siloxane structure to increase flame resistance and impact resistance; a copolymer of a polycarbonate resin with a monomer, oligomer, or polymer containing a phosphorus atom to further improve thermal oxidative stability and flame resistance; a copolymer of a polycarbonate resin with a monomer, oligomer, or polymer containing a dihydroxyanthraquinone structure to improve thermal oxidative stability; a copolymer of a polycarbonate resin with an oligomer or polymer containing an olefin structure such as polystyrene to improve photochemical properties; a copolymer of a polycarbonate resin with a polyester resin oligomer or polymer to improve chemical resistance, and so on.

To improve the appearance of the molded article and improve fluidity, (A) the polycarbonate resin may contain a polycarbonate oligomer. The viscosity-average molecular weight [Mv] of the polycarbonate oligomer is normally no less than 1500, and preferably no less than 2000, but normally no greater than 9500 and preferably no greater than 9000. In addition, the polycarbonate oligomer contained therein preferably comprises no greater than 30 mass % of the polycarbonate resin (including the polycarbonate oligomer).

In addition, (A) the polycarbonate resin can be not only a virgin raw material, but also a polycarbonate resin recycled from used products (a so called recycled polycarbonate resin material). Examples of these used products include, optical recording media such as optical disks; light guiding plates; transparent vehicle material parts such as automobile window glass, automobile headlamp lenses, and windscreens; containers such as water bottles; eyeglass lenses; and building materials such as acoustic panels, window glass, corrugated sheets, and so on. Moreover, powdered material obtained from defective products, sprues, runners, etc., or pellets obtained by melting the same can also be used.

However, recycled polycarbonate resins preferably account for no more than 80 mass %, and more preferably no more than 50 mass % of the polycarbonate resin contained in the polycarbonate resin of the present invention. Because a recycled polycarbonate resin may have undergone degradation such as thermal degradation and aging degradation, if such a polycarbonate resin is used in excess of the above range, the hue and mechanical properties may be diminished.

[3. (B) Metal Salt of an Organic Sulfonic Acid]

Component (B), a metal salt of an organic sulfonic acid is used in the present invention.

Examples of the metal contained in the metal salt of an organic sulfonic acid include alkali metals such as lithium (Li), sodium (Na), potassium (K), rubidium (Rb), and cesium (Cs); alkaline earth metals such as magnesium (Mg), calcium (Ca), strontium (Sr), and barium (Ba); as well as aluminum (Al), titanium (Ti), iron (Fe), cobalt (Co), nickel (Ni), copper (Cu), zinc (Zn), zirconium (Zr), and molybdenum (Mo), but preferably the metal is an alkali metal or alkaline earth metal. That is because these metals promote formation of a carbonized layer when the polycarbonate resin burns and can increase the flame resistance even more, and the properties of the polycarbonate resin such as shock resistance and other mechanical properties, heat resistance, electrical properties, and the like can be retained.

Between alkali metals and alkaline earth metals, alkali metals are preferred; sodium, potassium, cesium, or lithium is more preferred, sodium, potassium, or cesium is even more preferred, and sodium or potassium is particularly preferred.

Examples of this kind of (B) metal salt of an organic sulfonic acid include a lithium (Li) salt of an organic sulfonic acid, a sodium (Na) salt of an organic sulfonic acid, a potassium (K) salt of an organic sulfonic acid, a rubidium (Rb) salt of an organic sulfonic acid, a cesium (Cs) salt of an organic sulfonic acid, a magnesium (Mg) salt of an organic sulfonic acid, a calcium (Ca) salt of an organic sulfonic acid, a strontium (Sr) salt of an organic sulfonic acid, a barium (Ba) salt of an organic sulfonic acid, etc. Among these, an alkali metal salt of an organic sulfonic acid such as a sodium (Na) salt compound of an organic sulfonic acid, a potassium (K) salt compound of an organic sulfonic acid, a cesium (Cs) salt of an organic sulfonic acid, etc., is particularly preferred.

Preferred examples of (B) the metal salt of an organic sulfonic acid include a metal salt of a fluorine-containing aliphatic sulfonic acid, a metal salt of a fluorine-containing aliphatic sulfonic acid imide, a metal salt of an aromatic sulfonic acid, and a metal salt of an aromatic sulfonamide.

Concrete examples of the preferred metal salt of an organic sulfonic acid include the following: a metal salt of a fluorine-containing aliphatic sulfonic acid such as: an alkali metal salt of a fluorine-containing aliphatic sulfonic acid containing at least one C—F bond within its molecule such as potassium nonafluorobutane sulfonate, lithium nonafluorobutane sulfonate, sodium nonafluorobutane sulfonate, cesium nonafluorobutane sulfonate, lithium trifluoromethane sulfonate, sodium trifluoromethane sulfonate, potassium trifluoromethane sulfonate, potassium pentafluoro ethane sulfonate, potassium heptafluoropropane sulfonate, potassium decafluoro-4-(pentafluoroethyl)cyclohexane sulfone, etc.;

an alkaline earth metal salt of a fluorine-containing aliphatic sulfonic acid containing at least one C—F bond within its molecule such as magnesium nonafluorobutane sulfonate, calcium nonafluorobutane sulfonate, barium nonafluorobutane sulfonate, magnesium trifluoromethane sulfonate, calcium trifluoromethane sulfonate, barium trifluoromethane sulfonate, etc.; and an alkali metal salt of a fluorine-containing disulfonic acid containing at least 1 C—F bond within its molecule such as disodium difluoromethane disulfonate, dipotassium difluoromethane disulfonate, disodium tetrafluoroethane disulfonate, dipotassium tetrafluoroethane disulfonate, dipotassium hexafluoropropane disulfonate, dipotassium hexafluoroisopropane disulfonate, disodium octafluorobutane disulfonate, dipotassium octafluorobutane disulfonate; etc., a metal salt of a fluorine-containing aliphatic sulfonic acid imide such as: an alkali metal salt of a fluorine-containing aliphatic disulfonic acid imide containing at least one C—F bond within its molecule such as lithium bis(perfloropropane sulfonyl)imide, sodium bis(perfluoropropane sulfonyl)imide, potassium bis(perfloropropane sulfonyl)imide, lithium bis(perflorobutane sulfonyl)imide, sodium bis(perflorobutane sulfonyl)imide, potassium bis(perfluorobutane sulfonyl)imide, potassium trifluoromethane (pentafluoroethane) sulfonyl imide, sodium trifluoromethane (nonafluorobutane) sulfonyl imide, potassium trifluoromethane (nonafluorobutane) sulfonyl imide, trifluoromethane, etc.; and examples include: an alkali metal salt of a cyclic fluorine-containing aliphatic sulfonyl imide containing at least one C—F bond within its molecule such as lithium cyclohexafluoropropane-1,3-bis(sulfonyl)imide, sodium cyclohexafluoropropane-1,3-bis(sulfonyl)imide, dipotassium cyclohexafluoropropane-1,3-bis(sulfonyl)imide, etc.;

a metal salt of an aromatic sulfonic acid such as: an alkali metal salt of an aromatic sulfonic acid containing at least one type of aromatic group within its molecule such as dipotassium diphenyl sulfone-3,3'-disulfonate, potassium diphenyl sulfone-3-sulfonate, sodium benzene sulfonate, sodium (poly)styrene sulfonate, sodium para-toluene sulfonate, sodium (branched) dodecyl benzene sulfonate, sodium trichlorobenzene sulfonate, potassium benzene sulfonate, potassium styrene sulfonate, potassium (poly) styrene sulfonate, potassium para-toluene sulfonate, potassium (branched) dodecyl benzene sulfonate, potassium trichlorobenzene sulfonate, cesium benzene sulfonate, cesium (poly) styrene sulfonate, cesium para-toluene sulfonate, cesium (branched) dodecyl benzene sulfonate, cesium trichlorobenzene sulfonate, etc.;

an alkaline earth metal salt of an aromatic sulfonic acid containing at least 1 type of aromatic group within its molecule such as magnesium para-toluene sulfonate, calcium para-toluene sulfonate, strontium para-toluene sulfonate, barium para-toluene sulfonate, magnesium (branched) dodecyl benzene sulfonate, calcium (branched) dodecyl benzene sulfonate, etc.; and a metal salt of an aromatic sulfonamide such as: an alkali metal salt of an aromatic sulfonamide containing at least one type of aromatic group within its molecule such as sodium saccharin, potassium N-(p-tolylsulfonyl)-p-toluene sulfonamide, potassium N—(N'-benzyl aminocarbonyl) sulfanilimide, potassium N-(phenyl carboxyl) sulfanilimide, etc.

Among the example compounds that were noted above, the metal salt of a fluorine-containing aliphatic sulfonic acid, and metal salt of an aromatic sulfonic acid are more preferred, and the metal salt of a fluorine-containing sulfonic acid is particularly preferred.

Moreover, among the metal salts of fluorine-containing aliphatic sulfonic acids, an alkali metal salt of a fluorine-containing aliphatic sulfonic acid containing at least one C—F bond within its molecule is more preferred, an alkali metal salt of a perfluoroalkane sulfonic acid is particularly preferred, and concretely, one such as potassium nonafluorobutane sulfonate is preferred.

As a metal salt of an aromatic sulfonic acid, an alkali metal salt of an aromatic sulfonic acid is more preferred. Particularly preferred are alkali metal salts of diphenylsulfone sulfonic acids such as dipotassium diphenylsulfone-3,3'-disulfonate and potassium diphenylsulfone-3-sulfonate; and alkali metal salts of para-toluene sulfonic acid such as sodium para-toluene sulfonate and potassium para-toluene sulfonate, cesium para-toluene sulfonate, and the like. An alkali metal salt of para-toluene sulfonic acid is even more preferred.

It should be noted that one type of (B) the metal salt of an organic sulfonic acid can be used alone, or desired combinations of two or more types thereof in a desired ratio can be used together.

[4. (C) Compound with Inclusion Capability]

Component (C), a compound with inclusion capability, is used in the present invention.

The term (C) compound with inclusion capability refers to a compound that can incorporate a metal cation of (B) a metal salt of an organic sulfonic acid and activate a counter anion thereof.

As (C) the compound with inclusion capability, at least one type of compound selected from the group consisting of a cyclic polyether, cyclic polyether polyester, cyclic polyketone, cyclic polyamine, cyclic polyamine polyamide, cyclic poly thia-ether, aza-crown ether, thia-crown ether, cyclic aza-thia-crown ether, aza-thia-crown ether, bicyclic cryptand, tricyclic tryptand, and spherical cryptand is preferred.

Among these, a cyclic polyether is preferred, and a crown ether compound is particularly preferred.

In the present invention the term crown ether compound refers to a crown ether and derivatives thereof having a crown ether structure. A crown ether compound has a ring with repeating [—$CH_2$—$CH_2$—Y—] units, the —$CH_2$—$CH_2$— forming the ring may be substituted, and Y is an O, N, or S heteroatom. Examples of crown ether compounds include crown ethers, thia-crown ethers wherein oxygen is replaced with sulfur, aza-crown ethers wherein oxygen is replaced with nitrogen, and cryptands that are bicyclic crown ethers. Among these crown ethers and aza-crown ethers are preferred, and crown ethers are particularly preferred.

Because in such crown ether compounds the oxygen atoms, etc., inside the ring are negatively charged, they have the ability to capture the metal cation of the metal salt of the organic sulfonic acid within the ring and form a complex.

Concrete examples include crown ethers such as 18-crown-6-ether, 15-crown-5-ether, 12-crown-4-ether, 21-crown-7-ether, 24-crown-8-ether, and 30-crown-7-ether, and they also include types of crown ethers such as crown ether derivatives, lariats with long side chains attached to the crown, and bicyclic-crowned cryptands other than those noted above such as dibenzo-18-crown-6-ether, dibenzo-14-crown-4-ether, dibenzo-15-crown-5-ether, dibenzo-12-crown-4-ether, dibenzo-21-crown-7-ether, dibenzo-24-crown-8-ether, dibenzo-30-crown-10-ether, benzo-18-crown-6-ether, benzo-15-crown-5-ether, benzo-12-crown-4-ether, tribenzo-24-crown-8-ether, dicyclohexyl-12-crown-4-ether, dicyclohexyl-15-crown-5-ether, dicyclohexyl-18-crown-6-ether, n-octyl-12-crown-4-ether, n-octyl-15-crown-5-ether, n-octyl-18-crown-6-ether, etc.

Examples of the aza-crown ethers include 1-aza-15-crown-5, 1-aza-18-crown-6, 4,10-diaza-12-crown-4, 4,10-diaza-15-crown-5, 4,13-diaza-18-crown-6, N,N'-dibenzoyl-4,13-diaza-18-crown-6, N-phenyl aza-15-crown-5, etc.

Among these crown ether compounds the use of 15-crown-5-ether, 18-crown-6-ether, or dibenzo-18-crown-6-ether is preferred in the present invention, and these crown ethers are preferred from the standpoint of the cation size in the potassium salt or sodium salt, which is preferred as the metal salt of the organic sulfonic acid, because they easily form an inclusion compound having a complex structure with these ions.

[5. Inclusion Compound of (B) a Metal Salt of an Organic Sulfonic Acid and (C) a Compound with Inclusion Capability]

The flame retardant of the present invention comprises an inclusion compound of the above metal salt of an organic sulfonic acid and (C) the compound with inclusion capability above. A crown ether compound is preferred as (C) the compound with inclusion capability.

Crown ether compounds function to incorporate the metal cation of (B) a metal salt of an organic sulfonic acid, assume a stable complex structure, and form (D) an inclusion compound. Because the polarized void of the crown ether will enclose a cation having an ion size matching the void size therein, it is preferable to select the crown ether compound to be used depending on the type of metal cation. For example, when a potassium salt is used as the metal salt of the organic sulfonic acid, the use of an 18-crown-6-ether or dibenzo-18-crown-6 ether is preferred, and in the case of a sodium salt, the use of a 15-crown-5-ether is preferred.

The metal salt of the organic sulfonic acid is intrinsically hydrophilic and has poor compatibility with the polycarbonate resin, so clouding will occur even when it is added in very small amounts. However, by enclosing the metal salt of the organic sulfonic acid in the crown ether compound to form (D) an inclusion compound, the metal salt of the organic sulfonic acid becomes oil-soluble through the effect of the crown ether compound, and its compatibility with the polycarbonate resin improves dramatically. As a result, the problem of clouding can be eliminated, and ionization of the metal salt of the organic sulfonic acid is promoted through the formation of the complex structure between the metal salt of the organic sulfonic acid and the crown ether, thereby enabling effective flame resistance to be attained by adding an even smaller amount thereof.

As a matter of course, it should be noted that (B) a metal salt of an organic sulfonic acid and (C) a compound with inclusion capability can be contained in (A) the polycarbonate resin in the form of an inclusion compound in which the two form an inclusion compound beforehand.

Component (D), the inclusion compound, of (B) a metal salt of an organic sulfonic acid and (C) a compound with inclusion capability is not restricted to an inclusion compound formed at a 1:1 molar ratio. For example, various modes other than equimolar are acceptable such as a compound forming a structure wherein the metal cation of the metal salt of the organic sulfonic acid coordinates through some kind of interaction with the polar voids of a plurality of crown ether molecules. More specifically, it makes no difference if the ratio of the metal salt of the organic sulfonic acid to the crown ether compound is 1:2, 2:3, 3:4, or equimolar.

The process for producing (D) an inclusion compound of (B) a metal salt of an organic sulfonic acid and (C) a compound with inclusion capability can be any publicly known method. For example, (B) a metal salt of an organic sulfonic acid and (C) a compound with inclusion capability can be mixed and stirred using water, hot water, or an organic solvent as needed, or can be mixed and stirred while heating to a desired temperature to produce (D) an inclusion compound. As examples of such an organic solvent, a solvent such as an aromatic hydrocarbon compound, an aliphatic hydrocarbon compound, an alcohol compound, a ketone compound, an ester compound, a terpene compound can be used either alone or as a mixed solvent. Specific examples include acetone, toluene, xylene, hexane, pentane, kerosene, methanol, ethanol, 2-propanol, n-butanol, ethyl acetate, propyl acetate, butyl acetate, and the like.

If the resulting inclusion compound is poorly soluble in the water or organic solvent, it can be separated by first heating to form a homogeneous solution, and then cooled.

As a simple and preferred process for producing the inclusion compound, (B) a metal salt of an organic sulfonic acid and (C) a compound with inclusion capability can be mixed together in water or hot water. If the resulting inclusion compound is poorly soluble in water, it can be obtained by heating to make a homogenous solution, and then cooling and performing two-phase separation.

Moreover, preferably the water-containing inclusion compound is supplied without further processing to the kneading machine together with the other resin additives in the process of producing the polycarbonate resin composition.

In addition, preferably (B) a metal salt of an organic sulfonic acid and (C) a compound with inclusion capability are mixed with a small amount of water and with other resin additives, the aqueous solution obtained by heating and stirring the same is then mixed with (A) the polycarbonate resin, flakes are prepared therefrom, and then the flakes can be fed into the kneader, etc., without further processing.

With regard to the content of (B) a metal salt of an organic sulfonic acid and (C) a compound with inclusion capability in these methods or in the polycarbonate resin composition, the preferred molar ratio, i.e., (B)/(C), is 10/1-1/10. A ratio of 5/1-1/5 is more preferred, 3/1-1/3 is even more preferred, 2/1-1/2 is particularly preferred, and 1.5/1-1/1.5 is most preferred.

In the polycarbonate resin composition, with regard to the content of (B) a metal salt of an organic sulfonic acid per 100 parts by mass of (A) the polycarbonate resin, no less than 0.01 parts by mass is preferred, no less than 0.02 parts by mass is more preferred, no less than 0.03 parts by mass is even more preferred, no less than 0.04 parts by mass is even further preferred, and no less than 0.05 parts by mass is particularly preferred. The upper limit is no greater than 2 parts by mass, no greater than 1 part by mass is preferred, no greater than 0.5 parts is more preferred, and no greater than 0.3 parts by mass is particularly preferred. If the content is too low, the flame resistance becomes insufficient, and conversely, if the content is too high, the thermostability and resistance to hydrolysis decrease, and deterioration of the color tone may occur.

In the polycarbonate resin composition, the content of (C) a compound with inclusion capability per 100 parts by mass of (A) the polycarbonate resin is preferably no less than 0.01 parts by mass, no less than 0.02 parts by mass is more preferred, no less than 0.03 parts by mass is even more preferred, no less than 0.04 parts by mass is particularly preferred, and no less than 0.05 parts by mass is most preferred. The upper limit is preferably no greater than 2 parts by mass, no greater than 1 part by mass is preferred, no greater than 0.5 parts by mass is more preferred, and no greater than 0.3 parts by mass is particularly preferred. If the content is too low, the haze value may be insufficient, and conversely, if the content is too high, defects in the appearance of the molded article may occur, and mold fouling during injection molding may occur.

Moreover, the content of (D) an inclusion compound of (B) a metal salt of an organic sulfonic acid and (C) a compound with inclusion capability with respect to the polycarbonate resin is preferably no less than 0.005 mass %, no less than 0.01 mass % is more preferred, no less than 0.02 mass % is even more preferred, no less than 0.03 mass % is particularly preferred, and especially no less than 0.04 mass % is most preferred. Moreover, the upper limit is preferably no greater than 1 mass %, no greater than 0.7 mass % is more preferred, no greater than 0.5 mass % is even more preferred, and no greater than 0.3 mass % is most preferred. If the content is too low, the flame resistance may be insufficient, and conversely, if the content is too high, the thermostability of the polycarbonate resin may decrease, and defects in the appearance and a decrease in mechanical strength of the molded article may occur.

When an inclusion compound of (B) a metal salt of an organic sulfonic acid and a crown ether compound is used, the content with respect to the polycarbonate resin is preferably no less than 0.005 mass %, no less than 0.01 mass % is more preferred, no less than 0.02 mass % is even more preferred, no less than 0.03 mass % is particularly preferred, and no less than 0.04 mass % is most preferred. The upper limit is preferably no greater than 1 mass %, no greater than 0.7 mass % is more preferred, no greater than 0.5 mass % is even more preferred, and no greater than 0.3 mass % is particularly preferred. If the content is too low, the flame resistance may be insufficient, and conversely, if the content is too high, the thermostability of the polycarbonate resin may decrease, and defects in the appearance and a decrease in mechanical strength of the molded article, and mold fouling may occur.

[6. (E) Glass Fibers]

Preferably the polycarbonate resin composition of the present invention contains (E) glass fibers. By including the glass fibers, the rigidity and strength can be increased, and a polycarbonate resin composition with superb flame resistance and also excellent rigidity and strength can be provided.

The content of (E) glass fibers per 100 parts by mass of (A) the polycarbonate resin is preferably 3-80 parts by mass, more preferably 5-60 parts by mass, and particularly 10-45 parts by mass.

Any glass fibers normally used in a thermoplastic resin can be used as (E) glass fibers, but alkali-free glass (E glass) is preferred. The number-average fiber length of (E) glass fibers is preferably no less than 1 mm and no greater than 10 mm, and glass fibers with a diameter of no less than 5 μm and no greater than 20 μm are preferred. These glass fibers can be produced using any prior art, publicly known method, and more specifically, by pulverizing glass fiber strands in a hammer mill or ball mill for example.

If the number-average fiber length exceeds 10 mm, shedding of glass fibers and carbon black from the surface of the molded article is likely to occur, and productivity can easily decrease. If the number-average fiber length is less than 1 mm, the improvement in mechanical strength may be insufficient because the aspect ratio of the glass fibers is too small.

Moreover, when the diameter of the glass fibers is less than 5 μm, a similar lack of improvement in mechanical strength may occur, and if the diameter exceeds 20 μm, the external appearance may suffer. The diameter of the glass fibers is more preferably no less than 6 μm and no greater than 15 μm.

The pronounced effect of imparting flame resistance with only a small amount of flame retardant can be achieved by combining and using (B) a metal salt of an organic sulfonic acid, (C) a compound with inclusion capability, and (E) glass fibers. It is believed that the underlying principle is as follows: when combustion propagates through the glass fibers of the resin composition, (D) an inclusion compound of (B) a metal salt of an organic sulfonic acid and (C) a compound with inclusion capability, which has been made compatible with the resin and has been finely dispersed, exhibits a powerful extinguishing effect by aggregating in the vicinity of the glass fibers, and it decreases combustibility through interfering with propagation of combustion.

Moreover, if (G) a fluoropolymer described below is also contained therein at that time it can improve the melt properties of the resin composition, and when (E) glass fibers are used, it is preferable to also use (G) a fluoropolymer therewith because it can increase resistance to dripping during combustion.

Component (E) glass fibers used in the present invention can be surface treated with a silane coupling agent such as aminosilane or epoxysilane to increase the adhesion thereof to the polycarbonate resin.

[7. (F) Core/Shell Elastomer]

Preferably the polycarbonate resin composition of the present invention contains an elastomer. Preferably (F) a core/shell elastomer is utilized as the elastomer to be used in the present invention. In the past a diene-based rubber was often used as an elastomer, but diene-based rubbers easily discolor due to oxidative degradation or during molding, and by using such (F) a core/shell elastomer in combination with above components (B) and (C), as well as (G) a fluoropolymer described below, in the present invention it is possible to form a flame retardant polycarbonate resin material with excellent impact resistance while preventing combustion of the elastomer and concurrently improving flame resistance.

A core/shell type of graft copolymer is preferred as the core/shell elastomer, and a noteworthy example is a core/shell graft copolymer comprising a core layer of at least one type of rubber component selected from the group consisting of diene-based rubbers such as polybutadiene, polybutylacrylate rubbers, polyorganosiloxane rubbers, IPN type composite rubbers comprising a polyorganosiloxane rubber and a polyacrylacrylate rubber, and the like, and a shell layer formed by a (meth)acrylic acid ester surrounding the core.

Among these, a graft copolymer type elastomer having a diene-based rubbery polymer as the core layer and a shell layer wherein a (meth)acrylic acid ester is graft copolymerized thereto can be used most suitably. Any manufacturing method such as block polymerization, solution polymerization, suspension polymerization, emulsion polymerization and the like can be used as the process for producing the graft copolymer.

Preferred examples of the diene-based rubber of the core layer include butadiene rubbers such as polybutadiene, (partially) hydrogenated polybutadiene, and copolymers of butadiene and one or more vinyl monomers capable of copolymerizing therewith such as butadiene-styrene copolymer, (partially) hydrogenated polybutadiene-styrene copolymer, butadiene styrene block copolymer, (partially) hydrogenated polybutadiene-styrene block copolymer, butadiene-acrylonitrile copolymer, and a butadiene-acrylic rubber copolymer having isobutyl acrylate as the main component thereof; and isobutylene-based rubbers such as polyisobutylene, polyisobutylene-styrene copolymer, polyisobutylene-styrene block copolymer, and the like. Butadiene rubbers are particularly preferred among them.

Among these polybutadiene, a butadiene-styrene copolymer, or a butadiene-styrene block copolymer obtained by the copolymerization of 75-100 mass % of 1,3-butadiene and 0-25 mass % of one or more types of vinyl monomer capable of copolymerization therewith, is preferred as this kind of butadiene-based rubber. If the styrene content ratio is too large at this time, the flame resistance and impact resistance of the polycarbonate resin composition of the present invention can be decreased, so a butadiene-based rubber with a low styrene content ratio is even more preferred.

More specifically, polybutadiene, a butadiene-styrene copolymer, or a butadiene-styrene block copolymer obtained by the copolymerization of 95-100 mass % of 1,3-butadiene and 0-5 mass % of one or more types of vinyl monomer capable of copolymerization therewith, is more preferred as the butadiene-based rubber, and polybutadiene wherein 1,3-butadiene comprises essentially 100 mass % is particularly preferred. The expression "1,3-butadiene comprises essentially 100 mass %" refers to a rubber comprising only butadiene, but the rubber may contain minute amounts of other components for the purpose of increasing the thermostability of the rubbery polymer and to facilitate control of particle size. However, in such a case the other components normally comprise no greater than 5 mass %, preferably no greater than 3 mass %, and more preferably no greater than 1 mass % in the butadiene rubber.

Examples of the (meth)acrylic acid ester to be graft polymerized with the diene-based rubber include alkyl methacrylate esters such as methyl methacrylate, ethyl methacrylate, n-butyl acrylate and the like;

aryl methacrylates such as phenyl methacrylate, naphthyl methacrylate and the like; and glycidyl-containing methacrylates such as glycidyl acrylate, glycidyl methacrylate, and the like. Among these, an alkyl methacrylate ester is preferred and methyl methacrylate is even more preferred from the aspect of balance between heat resistance and the polycarbonate resin.

It should be noted that one type alone or two or more types of the above (meth)acrylic acid ester compound can be used.

Moreover, another vinyl-based monomer can be included in addition to the above (meth)acrylic acid ester compound as needed. Examples of the other vinyl-based monomer include:

aromatic vinyls such as styrene, α-methyl styrene and the like;

unsaturated nitriles such as acrylonitrile, methacrylonitrile, and the like;

vinyl ethers such as methyl vinyl ether, butyl vinyl ether, and the like;

maleimide compounds such as maleimide, N-methyl maleimide, N-phenyl maleimide, and the like;

and α,β-unsaturated carboxylic acids such as maleic acid, phthalic acid, itaconic acid, and the like, and the anhydrides thereof (e.g., maleic anhydride); and the like.

In addition, aromatic polyfunctional vinyl compounds such as divinyl benzene, divinyl toluene, and the like;

unsaturated carboxylic acid esters of a polyhydric alcohol such as ethylene glycol dimethacrylate, 1,3-butane diol diacrylate, trimethylol ethane triacrylate, trimethylol propane trimethacrylate, pentaerythritol tetramethacrylate, and the like;

allyl esters of unsaturated carboxylic acids such as acryl acrylate, acryl methacrylate, and the like; and di- and tri-aryl compounds such as diaryl phthalate, diaryl sebacate, triaryl triazine, and other crosslinking monomers can be used together therewith.

The content of the diene-based rubber in this kind of preferred core/shell elastomer is preferably 50-95 mass %, more preferably 70-90 mass %, and even more preferably 75-85 mass % of the total of 100 mass % of diene-based rubber, (meth)acrylic acid ester compounds, other monomers, and crosslinking monomers.

The content of the diene-based rubber of no more than the lower limit noted above is undesirable because that can lead to a decrease in impact resistance and decrease in flame resistance of the polycarbonate resin. Moreover, it is undesirable for the content of the diene-based rubber to exceed the upper limit noted above because that can also lead to a decrease in impact resistance and decrease in flame resistance of the polycarbonate resin.

Moreover, the content of the (meth)acrylic acid ester to be graft polymerized with the diene-based rubber is preferably 50-100 mass %, more preferably 75-100 mass %, even more preferably 90-100 mass %, and particularly preferably essentially 100 mass % of the total of 100 mass % of (meth)acrylic acid ester compounds, other monomers, and crosslinking monomers.

The content of the (meth)acrylic acid ester compound of less than the lower limit noted above is undesirable because that can lead to a decrease in impact resistance and decrease in flame resistance of the polycarbonate resin. Moreover, it is undesirable for the content of the (meth)acrylic acid ester compound to exceed the upper limit noted above because that can also lead to a decrease in impact resistance and decrease in flame resistance of the polycarbonate resin.

The process for producing the graft copolymer of the core/shell elastomer is not particularly limited herein, and any manufacturing method such as block polymerization, solution polymerization, suspension polymerization, emulsion polymerization and the like can be used as the process for producing the same. Moreover, the mode of polymerization can be single-step grafting or multi-step grafting, but from the aspect of productivity and facilitating particle size control, emulsion polymerization is preferred, and multi-step emulsion polymerization is more preferred. The polymerization method disclosed in Japanese Unexamined Patent Application Publication No. 2003-261629, for example, can be noted as this kind of multi-stage emulsion polymerization method.

In addition, preferably the average particle size of (F) the core/shell elastomer is 160-240 nm. When the average particle size is less than the above lower limit, the impact resistance of the polycarbonate resin composition of the present invention is likely to be inadequate, and if the average particle size exceeds the above upper limit, the flame resistance and fire retardant properties of the polycarbonate resin composition of the present invention are likely to decrease, impact resistance will also decrease during high temperature molding, and the original hue is also likely to deteriorate. An average particle size of 170-220 nm is more preferred, and 180-210 nm is even more preferred. It should be noted that the average particle size is determined from the $D_{50}$ of the volume-average particle size value when the graft polymer solution after the end of polymerization is measured by dynamic light scattering (DLS). For example, measurement can be carried out using a "Microtrac particle size analyzer 9230UPA" manufactured by NIKKISO Co.

Examples of this kind of core/shell elastomer include "Paraloid™ EXL2602," "Paraloid™ EXL2603," "Paraloid™ EXL2655," "Paraloid™ EXL2311," "Paraloid™ EXL2313," "Paraloid™ EXL2315," "Paraloid™ KM330," "Paraloid™ KM336P," and "Paraloid™ KCZ201" manufactured by Rohm and Haas Japan; "METABLEN™ C-223A," "METABLEN™ E-901," "METABLEN™ S-2001," and "METABLEN™ SPK-200" manufactured by MITSUBISHI RAYON Co.; and "Kane Ace™ M-511," "Kane Ace™ M-600," "Kane Ace™ M-400," "Kane Ace™ M-580," "Kane Ace™ M-711," and "Kane Ace™ MR-01" manufactured by KANEKA Corp., and the like.

The content of (F) the core/shell elastomer is preferably no less than 0.5 parts by mass with regard to 100 parts by mass of (A) the polycarbonate resin, no less than 0.75 parts by mass is more preferred, no less than 1 part by mass is even more preferred, and no less than 1.5 parts by mass is particularly preferred. Preferably the content is no greater than 10 parts by mass, more preferably no greater than 7 parts by mass, and even more preferably no greater than 4 parts by mass. When the content of (F) a core/shell elastomer is less than the lower limit of the above range, the impact resistance of the polycarbonate resin composition of the present invention is likely to be inadequate, and if the content exceeds the upper limit of the above range, decreases in flame resistance, impact resistance, hue, and discoloration resistance are likely to occur.

The polycarbonate resin composition of the present invention can reduce yellowing of the elastomer, reduce combustibility of the elastomer, and improve flame resistance by using (F) a core/shell elastomer and (G) a fluoropolymer described below in combination with (B) a metal salt of an organic sulfonic acid and (C) a compound with inclusion capability described above.

[8. (G) Fluoropolymer]

Preferably the polycarbonate resin composition of the present invention contains (G) a fluoropolymer. Component (G) a fluoropolymer preferably has a content of 0.001-1 part by mass with regard to 100 parts by mass of (A) the polycarbonate resin. Component (G) a fluoropolymer can be one type alone or can be a desired combination of two or more types used together in a desired ratio.

An example of (G) a fluoropolymer is a fluoroolefin resin. Fluoroolefin resins are usually polymers or copolymers with a fluoroethylene structure. Specific examples include difluoroethylene resins, tetrafluoroethylene resins, tetrafluoroethylene/hexafluoropropylene copolymer resins, tetrafluoroethylene/perfluoroalkyl vinyl ether copolymer resins, and the like. Among these, a tetrafluoroethylene resin and the like can be noted as preferred. A fluoroethylene resin with fibril-forming capability can be noted as this kind of resin.

Examples of a fluoroethylene resin capable of forming fibrils include "Teflon™ 6J" and "Teflon™ 640J" manufactured by DU PONT-MITSUI Fluorchemicals Co.; and "Polyflon™ F201L," "Polyflon™ F103," "Polyflon™ FA500B," and "Polyflon™ FA500H" manufactured by Daikin Industries, Ltd., and the like. In addition, commercially available products of an aqueous dispersion of a fluoroethylene resin include "Teflon™ 30J" and "Teflon 31-JR" manufactured by DU PONT-MITSUI Fluorochemicals Co., and "Polyflon™ D-1" manufactured by Daikin Industries, Ltd., and the like.

In addition, a fluoroethylene polymer with a multi-layered structure resulting from polymerization with a vinyl-based monomer can be used. Examples of such fluoroethylene polymers include composites such as a polystyrene-fluoroethylene composite, polystyrene-acrylonitrile-fluoroethylene composite, polymethyl methacrylate-fluoroethylene composite, a polybutyl methacrylate-fluoroethylene composite and the like. Specific examples include "METABLEN™ A-3800" manufactured by MITSUBISHI RAYON Co., "BLENDEX™ 449" manufactured by Chemtura Corp., and the like.

It should be noted that one type of (G) the fluorpolymer alone can be included, or two or more desired types can be combined and included in a desired ratio.

Preferably, (G) a fluoropolymer having a standard specific gravity of no less than 2.15 and no greater than 2.22 is used in the present invention. It is undesirable if the standard specific gravity is less than 2.15 because the combustion time will be prolonged and the flameout properties will tend to be poor, and resistance to dripping, i.e., resistance to flame spreading, will also tend to be poor. Moreover, if the standard specific gravity exceeds 2.22, resistance to dripping will tend to decrease, and drawdown resistance will also tend to decrease. Preferably the value of the standard specific gravity is 2.16-2.21, and even more preferably 2.17-2.20.

It should be noted that the standard specific gravity (also called SSG) is measured by the water displacement method using a molded sample in accordance with ASTM D4895.

The fluoropolymer is normally manufactured by emulsion polymerization, but the standard specific gravity (SSG) can be adjusted by the polymerization conditions and, for example, during the process of emulsion polymerization of a tetrafluoroethylene monomer, this can be accomplished by selecting the time for starting and stopping the infusion of the polymerization initiator and by adjusting other polymerization conditions.

Moreover, the average particle size of (G) a fluoropolymer in the present invention is not particularly limited herein, but preferably is 300-1,000 µm. It is undesirable if the average particle size is less than 300 µm, because the drip resistance properties of the polycarbonate resin composition of the present invention may decline, and conversely it is undesirable if the average particle size exceeds 1,000 µm because the fluoropolymer is more likely to clump, and may cause white spots or other appearance defects when formed into a molded object. From this standpoint, an average particle size of the fluoropolymer of 350-800 µm is preferred, 380-750 µm is more preferred, and 400-700 µm is particularly preferred.

As noted above, preferably the lower limit of the content of (G) a fluoropolymer with respect to 100 parts by mass of (A) the polycarbonate resin is no less than 0.001 parts by mass, and no less than 0.01 parts by mass is more preferred, no less than 0.05 parts by mass is even more preferred, and no less than 0.1 parts by mass is particularly preferred. For the upper limit, no greater than 1 part by mass is preferred, no greater than 0.75 parts by mass is more preferred, and no greater than 0.5 parts by mass is even more preferred. If the content of (G) a fluoropolymer is no greater than the lower limit of the aforementioned range, the flame resistance of (B) a metal salt of an organic sulfonic acid and (C) a compound with inclusion capability and the flame resistance brought about by (G) a fluoropolymer drip prevention agent are likely to be insufficient, and if the content exceeds the upper limit of the aforementioned range, defects in appearance and a decrease in the mechanical strength of the molded object formed from the polycarbonate resin composition are likely to occur.

[9. Other Additives]

The polycarbonate resin composition of the present invention can also contain various additives within a range that does not diminish the effect of the present invention. Examples of such additives include other flame retardants, thermostabilizers, antioxidants, mold release agents, UV light absorbers, pigments, fluorescent brightening agents, antistatic agents, anti-clouding agents, lubricants, anti-blocking agents, fluidity improving agents, thermal plasticizers, dispersants, antibacterial agents, and the like.

Thermostabilizers

A phosphorus-based compound can be noted as an example of a thermostabilizer. A publicly known, desired compound can be used as the phosphorus-based compound. Specific examples include oxo acids of phosphorus such as phosphoric acid, phosphonic acid, phosphorous acid, phosphonic acid, poly-phosphoric acid, and the like; acid metal salts of pyrophosphoric acid such as sodium acid pyrophosphate, potassium acid pyrophosphate, calcium acid pyrophosphate, and the like; group 1 or group 10 metal phosphoric acid salts such as potassium phosphate, sodium phosphate, cesium phosphate, zinc phosphate, and the like; and organic phosphate compounds, organic phosphite compounds, and organic phosphonite compounds.

Preferred among these are organic phosphite compounds such as triphenyl phosphite, tris(mononyl phenyl) phosphite, tris(mononyl dinonyl phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, 2,2-methylene bis(4,6-di-tert-butylphenyl) octyl phosphite and the like.

The content of thermostabilizer in relation to 100 parts by mass of polycarbonate resin is normally no less than 0.001 parts by mass, preferably no less than 0.01 parts by mass, and more preferably 0.03 parts by mass; moreover, normally no greater than 1 part by mass, preferably no greater than 0.7 parts by mass, and more preferably no greater than 0.5 parts by mass. If the content of thermostabilizer is too low, the thermostabilizing effect may be insufficient, and if the content of thermostabilizer is too great, resistance to hydrolysis can decrease, and the effectiveness can level off and become uneconomical.

Antioxidants

A hindered phenol-based antioxidant can be noted as an example of the antioxidant. Specific examples include pentaerythritol tetrakis[3-(3,5-di-tert-butyl-4-hydroxyphenyl) propionate], octadecyl 3-(3,5-di-tert-butyl-4-hydroxyphenyl) propionate, thiodiethylene bis[3-(3,5-di-tert-butyl-4-hydroxyphenyl)propionate], N,N'-hexane-1,6-diylbis[3-(3,5-di-tert-butyl-4-hydroxyphenyl propionamide), 2,4-dimethyl-6-(1-methyl pentadecyl) phenol, diethyl[[3,5-bis(1,1-dimethylethyl)-4-hydroxyphenyl]methyl]phosphonate, 3,3',3'',5,5',5''-hexa-tert-butyl-a,a',a''-(mesitylene-2,4,6-triyl)tri-p-cresol, 4,6-bis(octyl thiomethyl)-o-cresol, ethylene bis (oxyethylene)bis[3-(5-tert-butyl-4-hydroxy-m-tolyl) propionate], hexamethylene bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-yl amino) phenol, and the like.

Preferred among these are pentaerythritol tetrakis[3-(3,5-di-tert-butyl-4-hydroxyphenyl) propionate] and octadecyl 3-(3,5-di-tert-butyl-4-hydroxyphenyl)propionate.

The content of antioxidant with respect to 100 parts by mass of polycarbonate resin is normally no less than 0.001 parts by mass, preferably no less than 0.01 parts by mass, and normally no greater than 1 part by mass, preferably no greater than 0.5 parts by mass. If the content of antioxidant is no greater than the lower limit of the aforementioned range, the effect as an antioxidant can be insufficient, and if the content of antioxidant exceeds the upper limit of the aforementioned range, the effectiveness can level off and become uneconomical.

Mold Release Agents

Examples of mold release agents include aliphatic carboxylic acid, esters formed by an aliphatic carboxylic acid and an alcohol, aliphatic hydrocarbons with a number-average molecular weight of 200-15,000, and polysiloxane-based silicone oils.

Examples of an aliphatic carboxylic acid include saturated or unsaturated monohydric, dihydric, or trihydric carboxylic acids. In this case, the term aliphatic carboxylic acid also includes alicyclic carboxylic acids. Preferred aliphatic carboxylic acids among these are monohydric or dihydric $C_{6-36}$ carboxylic acids, and a saturated, monohydric $C_{6-36}$ aliphatic carboxylic acid is even more preferred. Specific examples of aliphatic carboxylic acids include palmitic acid, stearic acid, caproic acid, capric acid, lauric acid, arachidic acid, behenic acid, lignoceric acid, cerotic acid, melissic acid, tetratriacontanoic acid, montanic acid, adipic acid, and azelaic acid.

The same aliphatic carboxylic acids noted above can be used as the aliphatic carboxylic acid in the ester formed by an aliphatic carboxylic acid and an alcohol. Meanwhile, for example, a saturated or unsaturated monohydric or dihydric alcohol can be used as the alcohol. These alcohols can have substituents such as a fluorine atom, aryl group, and the like. Among these alcohols, a monohydric or polyhydric saturated alcohol of no greater than 30 carbon atoms is preferred, and an aliphatic or alicyclic saturated monohydric alcohol or aliphatic saturated polyhydric alcohol of no greater than 30 carbon atoms is more preferred.

Concrete examples of such an alcohol include octanol, decanol, dodecanol, stearyl alcohol, behenyl alcohol, ethylene glycol, diethylene glycol, glycerol, pentaerythritol, 2,2-dihydroxy perfluoropropanol, neopentylene glycol, ditrimethylolpropane, dipentaerythritol, and the like.

Concrete examples of the ester formed by the aliphatic carboxylic acid and the alcohol include beeswax (mixture containing myricyl palmitate as a main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, pentaerythritol tetrastearate, pentaerythritol oleate, and the like.

Examples of the aliphatic hydrocarbons having a number-average molecular weight of 200 to 15,000 include liquid paraffins, paraffin waxes, micro waxes, polyethylene waxes, Fischer-Tropsch waxes and α-olefin oligomers having 3 to 12 carbon atoms. It should be noted that the aliphatic hydrocarbons can also include alicyclic hydrocarbons.

Among these, aliphatic hydrocarbons such as paraffin waxes, polyethylene waxes or partially oxidized polyethylene waxes are preferred, and paraffin waxes and polyethylene waxes are even more preferred.

Moreover, the number-average molecular weight of the aforementioned hydrocarbon is preferably no greater than 5,000.

The content of mold release agent with respect to 100 parts by mass of polycarbonate resin is normally no less than 0.001 parts by mass, preferably no less than 0.01 parts by mass, and normally no greater than 2 parts by mass, preferably no greater than 1 part by mass. If the content of the mold release agent is less than the lower limit of the aforementioned range, the effect of the mold release agent may be insufficient, and if the content of the mold release agent exceeds the upper limit of the aforementioned range, a decrease in resistance to hydrolysis and fouling of the mold during injection molding, etc., can occur.

[10. Process for Producing the Polycarbonate Resin Composition]

The process for producing the polycarbonate resin composition of the present invention is not particularly limited herein, and a wide range of publicly known methods for producing a polycarbonate resin can be used. For example, a method can be noted wherein (B) a metal salt of an organic sulfonic acid and (C) a compound with inclusion capability can be mixed into (A) the polycarbonate resin either unprocessed or after forming the inclusion compound beforehand, and together with the other components to be contained therein as needed, can be premixed using a kind of mixer such as a tumbler, a Henschel mixer, a super mixer, a ribbon blender and the like first, and then melted and kneaded in a mixer such as a Banbury mixer, a roll mixer, a Brabender, a single screw kneader-extruder, a twin screw kneader-extruder, a kneader, and the like. It should be noted that the temperature of melt-kneading is not particularly limited herein, but is normally in the range of 220-360° C.

Moreover, as noted above, it is preferable to mix the metal salt of the organic sulfonic acid, crown ether compound, and other resin additives with a small amount of water and obtain an aqueous solution by heating and stirring the same, and then mix that solution with the polycarbonate resin to obtain flakes, and then feed the flakes into the kneader, etc.

[11. Molded Article]

The polycarbonate resin composition of the present invention can be pelleted, and the pellets can be molded by various molding methods to produce a molded article. Moreover, the resin that has been melt-kneaded in an extruder can be made directly into sheets and films, profile extrusion molded articles, blow molded articles or injection molded articles, etc., without passing through the pelleting stage.

Examples of molding methods include injection molding, ultra-high speed injection molding, injection-compression molding, two-color molding, blow molding such as gas-assisted molding, molding methods using an insulated die, molding methods using a high-speed heated dye, expansion molding (including supercritical fluid molding), insert molding, IMC (in-mold coating) molding, extrusion molding, sheet molding, thermoforming, rotational molding, laminating, press molding, and the like. A hot-runner molding method can also be used. The shape, pattern, color, dimensions, etc., of the molded article are not limited, and these matters can be established as desired to suit the use of the molded article.

Examples of preferred molded articles obtained by molding the composition of the present invention include lighting equipment, electrical and electronic equipment, office automation equipment, data terminal equipment, machine parts, household electric appliances, vehicle parts, building materials, various containers, and leisure goods and sundry items, as well as component parts therefor. Among these, the molded articles can be most suitably used for parts in electrical and electronic equipment, office automation equipment, data terminal equipment, household electric appliances, and the like.

EXAMPLES

The present invention is explained in greater detail below through examples. However, this should not be interpreted to mean the present invention is limited to the following examples.

[Polycarbonate Resin]

In Examples 1-14 and Comparative Examples 1-6 the following (A1) to (A3) polycarbonate resins were used as the polycarbonate resin.

(A1) NOVAREX™ M7027BF manufactured by Mitsubishi Engineering-Plastics Corporation Viscosity-average molecular weight: 27,000, Structural viscosity index N, 1.4

(A2) NOVAREX™ M70270J manufactured by Mitsubishi Engineering-Plastics Corporation Viscosity-average molecular weight: 20,000, Structural viscosity index N, 1.0

(A3) Iupilon™ H-4000 manufactured by Mitsubishi Engineering-Plastics Corporation Viscosity-average molecular weight: 16,000, Structural viscosity index N, 1.0

Example 1

Production of Resin Composition Pellets

First 0.1 parts by mass of potassium nonafluorobutane sulfonate ($C_4F_9SO_3K$) and 0.0781 parts by mass of 18-crown-6-ether (i.e., equimolar amounts of potassium nonafluorobutane sulfonate and 18-crown-6-ether) were added to 1 part by mass of water, dissolved by heating at 95° C. and stirring for 20 min, and then cooled to 25° C. and mixed by stirring to obtain a mixture thereof as a homogenous aqueous solution. This mixture was further mixed with 19.70 parts by mass of (A3) the polycarbonate resin above, 0.1 parts by mass of pentaerythritol tetrastearate, and 0.1 parts by mass of stearyl stearate (mold release agents) to obtain a flake starting material.

It should be noted that when the above mixture was analyzed by LC/MS (high-performance liquid chromatograph/mass spectrometer) and Raman spectrophotometer, it was confirmed that an inclusion compound of the potassium nonafluorobutane sulfonate and 18-crown-6-ether had been produced.

More specifically, after the water was distilled off the mixture, when measurement was performed using an Almega (Thermo Fisher Scientific K.K.) Raman spectrophotometer (conditions-excitation laser: 532 nm, laser power: 100%, aperture: 50 µm, exposure time: 1 sec, number of exposures: 4), the potassium nonafluorobutane sulfonate alone showed peaks at 741 $cm^{-1}$, 698 $cm^{-1}$, 671 $cm^{-1}$, 600 $cm^{-1}$, 561 $cm^{-1}$, and 536 $cm^{-1}$, and the 18-crown-6-ether alone showed peaks at 821 $cm^{-1}$, 578-1-1 $cm^{-1}$, and 414 $cm^{-1}$, but the potassium nonafluorobutane sulfonate/18-crown-6-ether inclusion compound showed peaks different from the two cases above at 870 $cm^{-1}$, 830 $cm^{-1}$, 748 $cm^{-1}$, 735 $cm^{-1}$, and 546 $cm^{-1}$.

Moreover, 65 parts by mass of (A1) the polycarbonate resin above and 15 parts by mass of (A2) the polycarbonate resin were blended together in a tumbler for 20 min and used as pellet starting material.

The above pellet starting material and the above flake starting material were fed into single-vent twin screw extruder (TOSHIBA MACHINE Co., model TEM37BS) equipped with a raw material inlet port and a die at rates of 48 kg/hr and 12.6 kg/hr, respectively, and kneaded at a screw speed of 400 rpm, extrusion speed of 60.6 kg/hr, and a barrel temperature of 280° C. Then the molten resin was extruded as a strand, rapidly cooled in a water tank, and made into pellets using a pelletizer to obtain pellets of the polycarbonate resin composition.

The resulting pellets were dried for 6 hr at 120° C., and then using an injection molding machine model J50 manufactured by Japan Steel Works, Ltd., injection molding was performed at a die temperature of 80° C., and cylinder temperature setting of 290° C. to obtain a molded article. Optical property testing was then carried out on molded test pieces that were 65 mm long, 45 mm wide, and 5 mm thick.

In the same manner, after the resulting pellets were dried for 6 hr at 120° C., injection molding was performed using injection molding machine model J50 manufactured by Japan Steel Works, Ltd. at a mold temperature of 80° C. and a cylinder temperature setting of 290° C. to obtain 125 mm long, 13 mm wide, and 2.5 mm thick test pieces for combustion testing.

[Flame Resistance Evaluation (UL)]

A vertical combustion test in accordance with UL standard 94V was performed on the resulting combustion test pieces, and the results were assigned a value of V-0, V-1, or V2 from best to worst. Items outside these standards were classified as NG (no good).

[Haze]

Haze was measured using the above optical properties test pieces (5 mm thick) in accordance with JIS K7136 using a model NDH-2000 haze meter (NIPPON DENSHOKU Industries Co.).

[Color Tone and YI Value]

The L value, a value, b value and YI value were measured by the transmission method using the above 5 mm thick optical properties test pieces in accordance with JIS K7015 using a model SE2000 spectral colorimeter (NIPPON DENSHOKU Industries Co.).

The above evaluation results are shown in Table 1.

Example 2

Example 2 was prepared in the same manner as Example 1 except the amount of the 18-crown-6-ether was changed to 0.0586 parts by mass (corresponding to 75 mol % in relation to the potassium nonafluorobutane sulfonate, and it was confirmed by LC/MS and Raman spectrophotometer that an inclusion compound was formed by the potassium nonafluorobutane sulfonate and 18-crown-6-ether). The evaluation results are shown in Table 1.

Example 3

Example 3 was prepared in the same manner as Example 1 except the amount of the 18-crown-6-ether was changed to 0.0391 parts by mass (corresponding to 50 mol % in relation to the potassium nonafluorobutane sulfonate, and in the same manner as above it was confirmed that an inclusion compound was formed). The evaluation results are shown in Table 1.

Example 4

Example 4 was prepared in the same manner as Example 1 except the amount of (A3) the polycarbonate resin was changed to 19.65 parts by mass, the amount of potassium nonafluorobutane sulfonate was changed to 0.15 parts by mass, the amount of the 18-crown-6-ether was changed to 0.118 parts by mass (corresponding to an equimolar amount in relation to the potassium nonafluorobutane sulfonate) and the amount of water was changed to 1.5 parts by mass (and it was confirmed that an inclusion compound was formed in the same manner as above). The feed rate of the flake starting material into the extruder was also changed to 12.9 kg/hr. The evaluation results are shown in Table 1.

Example 5

Example 5 was prepared in the same manner as Example 1 except 0.0651 parts by mass of 15-crown-5-ether was used in place of the 18-crown-6-ether (corresponding to an equimolar amount in relation to the potassium nonafluorobutane sulfonate and it was confirmed that an inclusion compound was formed in the same manner as above). The evaluation results are shown in Table 1.

Example 6

Example 6 was prepared in the same manner as Example 1 except 0.105 parts by mass of dibenzo-18-crown-6-ether was used in place of the 18-crown-6-ether (corresponding to an equimolar amount in relation to the potassium nonafluorobutane sulfonate) and using acetone in place of water, after the potassium nonafluorobutane sulfonate was mixed and dissolved for 20 min at 25° C., the acetone was distilled off (and it was confirmed that an inclusion compound was formed in the same manner as above). The evaluation results are shown in Table 1.

Example 7

Example 7 was prepared in the same manner as Example 1 except the amount of the 18-crown-6-ether was changed to 0.0976 parts by mass (corresponding to 125 mol % in relation to the potassium nonafluorobutane sulfonate, and it was confirmed that an inclusion compound was formed in the same manner as above). The evaluation results are shown in Table 2.

Example 8

Example 8 was prepared in the same manner as Example 1 except the amount of the 18-crown-6-ether was changed to 0.117 parts by mass (corresponding to 150 mol % in relation to the potassium nonafluorobutane sulfonate, and it was confirmed that an inclusion compound was formed in the same manner as above). The evaluation results are shown in Table 2.

Example 9

Example 9 was prepared in the same manner as Example 1 except the amount of trifluoromethane sulfonic acid was changed to 0.0847 parts by mass and the amount of the 18-crown-6-ether was changed to 0.119 parts by mass (corresponding to an equimolar amount in relation to the trifluoromethane sulfonic acid, and it was confirmed that an inclusion compound was formed in the same manner as above). The evaluation results are shown in Table 2.

Comparative Example 1

Comparative Example 1 was prepared in the same manner as Example 1 except the 18-crown-6-ether was not used. The evaluation results are shown in Table 2.

Comparative Example 2

Comparative Example 2 was prepared in the same manner as Example 4 except the 18-crown-6-ether was not used. The evaluation results are shown in Table 2.

Comparative Example 3

Comparative Example 3 was prepared in the same manner as Example 9 except the 18-crown-6-ether was not used. The evaluation results are shown in Table 2.

TABLE 1

| | | Examples | | | | | |
|---|---|---|---|---|---|---|---|
| | | 1 | 2 | 3 | 4 | 5 | 6 |
| Content of metal salt of organic sulfonic acid/ compound with inclusion capability (parts by mass) | $C_4F_9SO_3K$/18-crown-6-ether (equimolar) | 0.1/ 0.0781 | | | | | |
| | $C_4F_9SO_3K$/18-crown-6-ether (molar ratio 1/0.75) | | 0.1/ 0.0586 | | | | |
| | $C_4F_9SO_3K$/18-crown-6-ether (molar ratio 1/0.5) | | | 0.1/ 0.0391 | | | |
| | $C_4F_9SO_3K$/18-crown-6-ether (molar ratio 1/1.25) | | | | | | |
| | $C_4F_9SO_3K$/18-crown-6-ether (molar ratio 1/1.5) | | | | | | |
| | $C_4F_9SO_3K$/18-crown-6-ether (equimolar) | | | | 0.15/ 0.118 | | |
| | $C_4F_9SO_3K$/15-crown-5-ether (equimolar) | | | | | 0.1/ 0.0651 | |
| | $C_4F_9SO_3K$/dibenzo-18-crown-6-ether (equimolar) | | | | | | 0.1/ 0.105 |
| | $CF_3SO_3K$/18-crown-6-ether (equimolar) | | | | | | |
| Metal salt of organic sulfonic acid compound (parts by mass) | $C_4F_9SO_3K$ | | | | | | |
| | $CF_3SO_3K$ | | | | | | |
| Flame resistance (UL 2.5 mm t) | | V-0 | V-0 | V-0 | V-0 | V-0 | V-0 |
| Haze (% 5 mm t) | | 1.05 | 1.83 | 1.89 | 1.02 | 2.74 | 1.97 |
| Color tone | L value | 93.61 | — | — | 93.19 | 91.66 | 92.45 |
| | a value | −0.19 | — | — | −0.11 | −0.31 | −0.14 |
| | b value | 0.69 | — | — | 0.74 | 2.71 | 1.29 |
| | YI | 1.39 | 2.31 | 2.51 | 1.56 | 5.27 | 2.61 |

TABLE 2

| | | Examples | | | Comparative Examples | | |
|---|---|---|---|---|---|---|---|
| | | 7 | 8 | 9 | 1 | 2 | 3 |
| Content of metal salt of organic sulfonic acid/ compound with inclusion capability (parts by mass) | $C_4F_9SO_3K$/18-crown-6-ether (equimolar) | | | | | | |
| | $C_4F_9SO_3K$/18-crown-6-ether (molar ratio 1/0.75) | | | | | | |
| | $C_4F_9SO_3K$/18-crown-6-ether (molar ratio 1/0.5) | | | | | | |
| | $C_4F_9SO_3K$/18-crown-6-ether (molar ratio 1/1.25) | 0/1 0.0976 | | | | | |
| | $C_4F_9SO_3K$/18-crown-6-ether (molar ratio 1/1.5) | | 0.1/ 0.117 | | | | |
| | $C_4F_9SO_3K$/18-crown-6-ether (equimolar) | | | | | | |
| | $C_4F_9SO_3K$/15-crown-5-ether (equimolar) | | | | | | |
| | $C_4F_9SO_3K$/dibenzo-18-crown-6-ether (equimolar) | | | | | | |
| | $CF_3SO_3K$/18-crown-6-ether (equimolar) | | | 0.0847/ 0.119 | | | |
| Metal salt of organic sulfonic acid compound (parts by mass) | $C_4F_9SO_3K$ | | | | 0.1 | 0.15 | |
| | $CF_3SO_3K$ | | | | | | 0.0847 |
| Flame resistance (UL 2.5 mm t) | | V-0 | V-0 | V-0 | V-0 | V-0 | V-0 |
| Haze (% 5 mm t) | | 1.05 | 1.07 | 1.04 | 3.70 | 52.25 | 69.62 |
| Color tone | L value | — | — | 93.35 | 90.43 | 54.45 | 47.24 |
| | a value | — | — | −0.21 | −0.46 | 2.92 | 3.51 |
| | b value | — | — | 1.21 | 4.43 | 18.85 | 16.37 |
| | YI | 1.62 | 1.85 | 2.36 | 8.61 | 66.03 | 67.56 |

Tables 1 and 2 clearly show that a composition comprising (B) a metal salt of an organic sulfonic acid and (C) a compound with inclusion capability has excellent flame resistance, and even a 5 mm thick molded article has no clouding problems, exhibits an extremely good haze value and has superb color tone.

Meanwhile, in the comparative examples that do not comprise (C) a compound with inclusion capability, it is clear that although the flame resistance is on the same level, the haze value, brightness, color tone, and yellowing index are poor compared with the items in the examples.

Example 10

Production of Resin Composition Pellets

First 0.1 parts by mass of potassium nonafluorobutane sulfonate ($C_4F_9SO_3K$) and 0.0781 parts by mass of 18-crown-6-ether (i.e., equimolar amounts of potassium nonafluorobutane sulfonate and 18-crown-6-ether) were added to 1 part by mass of water, dissolved by heating at 95° C. and stirring for 20 min, and then cooled to 25° C. and mixed by stirring to obtain a mixture as a homogenous aqueous solution (wherein production of an inclusion compound was confirmed). This mixture was further mixed with 19.70 parts by mass of (A3) the polycarbonate resin above, 0.1 parts by mass of pentaerythritol tetrastearate, and 0.1 parts by mass of stearyl stearate (mold release agents) to obtain a flake starting material.

Moreover, 65 parts by mass of (A1) the polycarbonate resin above and 15 parts by mass of (A2) the polycarbonate resin were blended together in a tumbler for 20 min and used as pellet starting material.

The above pellet starting material and the above flake starting material were fed into single-vent twin screw extruder (TOSHIBA MACHINE Co., model TEM37BS) equipped with a raw material inlet port and a die at rates of 48 kg/hr and 12.6 kg/hr, respectively, and kneaded at a screw speed of 400 rpm, extrusion speed of 60.6 kg/hr, and a barrel temperature of 280° C. Then the molten resin was extruded as a strand, rapidly cooled in a water tank, and made into pellets using a pelletizer to obtain pellets of the polycarbonate resin composition.

After the resulting pellets were dried for 6 hr at 120° C., injection molding was performed using an injection molding machine model J50 manufactured by Japan Steel Works, Ltd. at a mold temperature of 80° C. and a cylinder temperature setting of 290° C. to obtain molded test pieces for optical properties testing that were 65 mm long, 45 mm wide, and 3 mm thick.

[Wet Heat Accelerated Test]

The 3 mm thick test piece for optical properties testing obtained in the above manner were treated under conditions of 121° C., 2 atm, and 100% RH for 25 hr and for 50 hr using a pressure cooker test apparatus (HASTEST MODEL PC-SIII manufactured by Hirayama Manufacturing Corp.). The haze values were measured in the molded piece at 0 hr (before treatment), and in accordance with JIS K7163, in the above test pieces for optical properties testing (3 mm thick) at 0 hr (before treatment), and after 25 hr and 50 hr of treatment using a model NDH-2000 haze meter manufactured by NIPPON DENSHOKU Industries Co. Moreover, the viscosity-average molecular weight of the polycarbonate resin in the test pieces was measured before and after treatment.

The results are shown in Table 3.

Example 11

Example 11 was prepared in the same manner as Example 10 except the amount of (A3) the polycarbonate resin was changed to 19.72 parts by mass, the amount of potassium nonafluorobutane sulfonate was changed to 0.08 parts by mass, and the amount of the 18-crown-6-ether was changed to 0.0625 parts by mass (corresponding to an equimolar amount in relation to the potassium nonafluorobutane sulfonate, and it was confirmed that an inclusion compound was formed). The evaluation results are shown in Table 3.

Example 12

Example 12 was prepared in the same manner as Example 11 except the amount of the 18-crown-6-ether was changed to 0.0313 parts by mass (corresponding to 50 mol % in relation to the potassium nonafluorobutane sulfonate, and it was confirmed that an inclusion compound was formed). The evaluation results are shown in Table 3.

Example 13

Example 13 was prepared in the same manner as Example 10 except the amount of (A3) the polycarbonate resin was changed to 19.74 parts by mass, the amount of potassium nonafluorobutane sulfonate was changed to 0.06 parts by mass, and the amount of the 18-crown-6-ether was changed to 0.0469 parts by mass (corresponding to an equimolar amount in relation to the potassium nonafluorobutane sulfonate, and it was confirmed that an inclusion compound was formed). The evaluation results are shown in Table 3.

Example 14

Example 14 was prepared in the same manner as Example 13 except the amount of the 18-crown-6-ether was changed to 0.0234 parts by mass (corresponding to 50 mol % in relation to the potassium nonafluorobutane sulfonate, and it was confirmed that an inclusion compound was formed). The evaluation results are shown in Table 3.

Comparative Example 4

Comparative Example 4 was prepared in the same manner as Example 10 except the 18-crown-6-ether was not used. The evaluation results are shown in Table 3.

Comparative Example 5

Comparative Example 5 was prepared in the same manner as Example 11 except the 18-crown-6-ether was not used. The evaluation results are shown in Table 3.

Comparative Example 6

Comparative Example 6 was prepared in the same manner as Example 13 except the 18-crown-6-ether was not used. The evaluation results are shown in Table 3.

TABLE 3

| | | Examples | | | | | Comparative Examples | | |
|---|---|---|---|---|---|---|---|---|---|
| | | 10 | 11 | 12 | 13 | 14 | 4 | 5 | 6 |
| Content of metal salt of organic sulfonic acid/ compound with inclusion capability (parts by mass) | $C_4F_9SO_3K$/18-crown-6-ether (equimolar) | 0.1/ 0.0781 | | | | | | | |
| | $C_4F_9SO_3K$/18-crown-6-ether (equimolar) | | 0.08/ 0.0625 | | | | | | |
| | $C_4F_9SO_3K$/18-crown-6-ether (molar ratio 1/0.5) | | | 0.08/ 0.0313 | | | | | |
| | $C_4F_9SO_3K$/18-crown-6-ether (equimolar) | | | | 0.06/ 0.0469 | | | | |
| | $C_4F_9SO_3K$/18-crown-6-ether (molar ratio 1/0.5) | | | | | 0.06/ 0.0234 | | | |
| Metal salt of organic sulfonic acid compound (parts by mass) | $C_4F_9SO_3K$ | | | | | | 0.1 | 0.08 | 0.06 |
| Flame resistance (UL 2.5 mm t) | | V-0 | V-0 | V-0 | V-0 | V-0 | V-0 | V-0 | V-0 |
| Wet heat test: before and after haze values (% 3 mm t) | | | | | | | | | |
| Before treatment (0 hr) | | 0.77 | 0.75 | 0.88 | 0.63 | 0.77 | 2.55 | 1.02 | 0.83 |
| After 25 hr of treatment | | 2.3 | 2.04 | 4.12 | 1.49 | 2.68 | 89.26 | 65.45 | 5.49 |
| After 50 hr of treatment | | 5.43 | 4.83 | 13.55 | 4.38 | 8.76 | 99.24 | 79.75 | 17.94 |
| Wet heat test: before and after viscosity-average molecular weight (Mv) | | | | | | | | | |
| Before treatment (0 hr) | | 21200 | 21000 | 21000 | 21100 | 21000 | 21000 | 21400 | 21200 |
| After 50 hr of treatment | | 19500 | 19500 | 19400 | 19500 | 19400 | 19500 | 19500 | 19700 |

As Table 3 clearly shows, it can be confirmed that the polycarbonate composition comprising (B) a metal salt of an organic sulfonic acid and (C) a compound with inclusion capability is effective in inhibiting the increase in haze (clouding) after the wet heat accelerated test.

Examples 15-30 and Comparative Examples 7-17

The following items were used for (A) the polycarbonate resin, (E) glass fibers, and (G) fluoropolymer in Examples 15-30 and Comparative Examples 7-17.
Polycarbonate Resin (Labeled PC(A4) in Tables)
Iupilon™ S-3000 manufactured by Mitsubishi Engineering-Plastics Corporation, viscosity-average molecular weight: 21,000
(E) Glass Fibers (Labeled GF in Tables)
CSO3MAFT737™ manufactured by OWENS CORNING JAPAN, average fiber length: 3 mm, average diameter: 13 μm
(G) Fluoropolymer (labeled PTFE in tables)
Teflon™ 6J polytetrafluoroethylene resin, manufactured by DU PONT-MITSUI Fluorochemicals Co.

Example 15

Production of Resin Composition Pellets

First the starting materials of 70 parts by mass of the above polycarbonate resin (PC(A4)), 0.1 parts by mass of pentaerythritol tetrastearate and 0.1 parts by mass of stearyl stearate as mold release agents, 0.1 parts by mass of the above polytetrafluoroethylene, and 30 parts by mass of glass fibers were prepared. In addition, a homogenous aqueous solution was prepared by mixing 0.075 parts by mass of potassium nonafluorobutane sulfonate ($C_4F_9SO_3K$) and 0.0586 parts by mass of 18-crown-6-ether (i.e., equimolar amounts of potassium nonafluorobutane sulfonate and 18-crown-6-ether) with 1 part by mass of water, dissolving the same by heating at 95° C. and stirring for 20 min, and letting the solution stand to cool to 25° C., and stirring again. All materials except the glass fibers were uniformly mixed together in a tumbler to obtain a flake starting material. The flaked starting material and the glass fibers were then melted and kneaded together as described below.

More specifically, the above flake starting material and the glass fibers were side-fed at a rate of 21.1 kg/hr and at a rate of 9.0 kg/hr, respectively, into the base of a single-vent twin screw extruder (TOSHIBA MACHINE Co., model TEM37BS) equipped with a main starting material inlet port, a side feed port and a die in the base thereof, and kneaded at a screw speed of 300 rpm, extrusion speed of 30.1 kg/hr, and a barrel temperature of 280° C. Then the molten resin was extruded as a strand, rapidly cooled in a water tank, and made into pellets using a pelletizer to obtain pellets of the polycarbonate resin composition.

[(1) Flame Resistance Evaluation (UL)]
After the resulting pellets were dried for 6 hr at 120° C., injection molding was performed using an injection molding machine model J50 manufactured by Japan Steel Works, Ltd. at a mold temperature of 80° C. and a cylinder temperature setting of 290° C. to obtain 125 mm long, 13 mm wide, and 2.5 mm thick test pieces for combustion testing.

A vertical combustion test in accordance with UL standard 94V was performed on the resulting combustion test pieces, and the results were assigned a value of V-0, V-1, or V2 from best to worst. Items outside these standards were classified as NG (no good).

[(2) Maximum Tensile Strength, Young's Modulus]
Using the pellets obtained in the above manner, an ISO multipurpose test piece (thickness: 4 mm) was produced using a model SG75 Cycap M-2 injection molding machine (mold clamping force 75 t) manufactured by Sumitomo Heavy Industries at a cylinder temperature of 290° C. and a mold temperature of 110° C. Using the resulting ISO test pieces, the maximum tensile strength (units: MPa) and Young's modulus (units: MPa) were measured at a temperature of 23° C. in accordance with standards ISO 527-1 and ISO 527-2.

[(3) Flexural Strength, Flexural Modulus]

Using flexural test pieces (thickness: 4 mm) produced in the same manner as (2) above, the flexural strength (units: MPa) and flexural modulus (units: MPa) were measured at a temperature of 23° C. in accordance with ISO 178.

The above evaluation results are shown in Table 4.

Example 16

Example 16 was prepared in the same manner as Example 15 except the amounts of the potassium nonafluorobutane sulfonate and 18-crown-6-ether were changed to the amounts shown in Table 4 (corresponding to equimolar amounts of potassium nonafluorobutane sulfonate and 18-crown-6 ether). The evaluation results are shown in Table 4.

Example 17

Example 17 was prepared in the same manner as Example 15 except the amounts of the potassium nonafluorobutane sulfonate and 18-crown-6-ether were changed to the amounts shown in Table 4 (corresponding to 50 mol % of 18-crown-6 ether in relation to the potassium nonafluorobutane sulfonate). The evaluation results are shown in Table 4.

Example 18

Example 18 was prepared in the same manner as Example 15 except the amounts of the potassium nonafluorobutane sulfonate and 18-crown-6-ether were changed to the amounts shown in Table 4 (corresponding to 50 mol % of 18-crown-6 ether in relation to the potassium nonafluorobutane sulfonate). The evaluation results are shown in Table 4.

Example 19

Example 19 prepared in the same manner as Example 15 except the amount of potassium nonafluorobutane sulfonate was changed to the amount shown in Table 4 and the amount of 18-crown-6-ether was changed to the amount shown in Table 4 (corresponding to an equimolar amount in relation to the potassium nonafluorobutane sulfonate). The evaluation results are shown in Table 4.

TABLE 4

| | | Examples | | | | |
|---|---|---|---|---|---|---|
| | | 15 | 16 | 17 | 18 | 19 |
| PC(A4) | Parts by mass | 70 | 70 | 70 | 70 | 70 |
| GF | Parts by mass | 30 | 30 | 30 | 30 | 30 |
| $C_4F_9SO_3K$/18-crown-6-ether (equimolar) | Content of metal salt of organic sulfonic acid/compound with inclusion capability (parts by mass) | 0.075/0.0586 | 0.12/0.0938 | | | |
| $C_4F_9SO_3K$/18-crown-6-ether (molar ratio 1/0.5) | | | | 0.075/0.0293 | 0.12/0.0469 | |
| $CF_3SO_3K$/18-crown-6-ether (equimolar) | | | | | | 0.085/0.120 |
| PTFE | Parts by mass | 0.1 | 0.1 | 0.1 | 0.1 | 0.1 |
| Flame resistance (UL 2.5 mm t) | | V-0 | V-0 | V-0 | V-0 | V-0 |
| Maximum tensile strength | MPa | 79 | 78 | 73 | 71 | 79 |
| Young's modulus | MPa | 8200 | 8200 | 8000 | 8000 | 8100 |
| Flexural strength | MPa | 108 | 113 | 106 | 106 | 110 |
| Flexural modulus | MPa | 8100 | 8000 | 7900 | 7800 | 8000 |

Comparative Examples 7-10

Comparative Examples 7-10 were prepared in the same manner as Example 15 except the 18-crown-6-ether was not used, and the amounts of the metal salt of the sulfonic acid were those shown in Table 5. The evaluation results are shown in Table 5.

TABLE 5

| | | Comparative Examples | | | |
|---|---|---|---|---|---|
| | | 7 | 8 | 9 | 10 |
| PC(A4) | Parts by mass | 70 | 70 | 70 | 70 |
| GF | Parts by mass | 30 | 30 | 30 | 30 |
| $C_4F_9SO_3K$ | Parts by mass | | 0.075 | 0.12 | |
| $CF_3SO_3K$ | Parts by mass | | | | 0.085 |
| PTFE | Parts by mass | 0.1 | 0.1 | 0.1 | 0.1 |
| Flame resistance (UL 2.5 mm t) | | NG | V-0 | V-0 | V-0 |
| Maximum tensile strength | MPa | 81 | 66 | 65 | 66 |
| Young's modulus | MPa | 8300 | 7800 | 7700 | 7700 |
| Flexural strength | MPa | 115 | 103 | 102 | 102 |
| Flexural modulus | MPa | 8100 | 7600 | 7600 | 7600 |

Examples 20-22, Comparative Examples 11-13

Examples 20-22 and Comparative Examples 11-13 were prepared in the same manner as Example 15 except 80 parts by mass of polycarbonate resin and 20 parts by mass of glass fibers were used, and the amounts of potassium nonafluorobutane sulfonate, potassium trifluoromethane sulfonic acid, and 18-crown-6 ether were those shown in Table 6. The flake starting material and the glass fibers were side-fed into the base of the extruder at a rate of 24.1 kg/hr and at a rate of 6.0 kg/hr, respectively. The evaluation results are shown in Table 6.

TABLE 6

| | | Examples | | | Comparative Examples | | |
|---|---|---|---|---|---|---|---|
| | | 20 | 21 | 22 | 11 | 12 | 13 |
| PC(A4) | Parts by mass | 80 | 80 | 80 | 80 | 80 | 80 |
| GF | Parts by mass | 20 | 20 | 20 | 20 | 20 | 20 |
| $C_4F_9SO_3K$/18-crown-6-ether (equimolar) | Content of metal salt of organic sulfonic acid/compound with inclusion capability (parts by mass) | 0.075/0.0586 | | | | | |
| $C_4F_9SO_3K$/18-crown-6-ether (molar ratio 1/0.5) | | | 0.12/0.0938 | | | | |
| $CF_3SO_3K$/18-crown-6-ether (equimolar) | | | | 0.085/0.120 | | | |
| $C_4F_9SO_3K$ | Parts by mass | | | | 0.075 | 0.12 | |
| $CF_3SO_3K$ | Parts by mass | | | | | | 0.085 |
| PTFE | Parts by mass | 0.1 | 0.1 | 0.1 | 0.1 | 0.1 | 0.1 |
| Flame resistance (UL 2.5 mm t) | | V-0 | V-0 | V-0 | V-0 | V-0 | V-0 |
| Maximum tensile strength | MPa | 60 | 58 | 59 | 53 | 52 | 52 |
| Young's modulus | MPa | 5800 | 5800 | 5800 | 5500 | 5500 | 5500 |
| Flexural strength | MPa | 95 | 94 | 95 | 93 | 92 | 92 |
| Flexural modulus | MPa | 5700 | 5600 | 5700 | 5400 | 5400 | 5400 |

Examples 23-25, Comparative Examples 14-16

Examples 23-25 and Comparative Examples 14-16 were prepared in the same manner as Example 15 except 90 parts by mass of polycarbonate resin and 10 parts by mass of glass fibers were used, and the amounts of potassium nonafluorobutane sulfonate, potassium trifluoromethane sulfonic acid, and 18-crown-6 ether were those shown in Table 7. The flake starting material and the glass fibers were side-fed into the base of the extruder at a rate of 27.1 kg/hr and at a rate of 3.0 kg/hr, respectively.

The evaluation results are shown in Table 7.

TABLE 7

| | | Examples | | | Comparative Examples | | |
|---|---|---|---|---|---|---|---|
| | | 23 | 24 | 25 | 14 | 15 | 16 |
| PC(A4) | Parts by mass | 90 | 90 | 90 | 90 | 90 | 90 |
| GF | Parts by mass | 10 | 10 | 10 | 10 | 10 | 10 |
| $C_4F_9SO_3K$/18-crown-6-ether (equimolar) | Content of metal salt of organic sulfonic acid/compound with inclusion capability (parts by mass) | 0.075/0.0586 | | | | | |
| $C_4F_9SO_3K$/18-crown-6-ether (molar ratio 1/0.5) | | | 0.12/0.0938 | | | | |
| $CF_3SO_3K$/18-crown-6-ether (equimolar) | | | | 0.085/0.120 | | | |
| $C_4F_9SO_3K$ | Parts by mass | | | | 0.075 | 0.12 | |
| $CF_3SO_3K$ | Parts by mass | | | | | | 0.085 |

TABLE 7-continued

|  |  | Examples | | | Comparative Examples | | |
|---|---|---|---|---|---|---|---|
|  |  | 23 | 24 | 25 | 14 | 15 | 16 |
| PTFE | Parts by mass | 0.1 | 0.1 | 0.1 | 0.1 | 0.1 | 0.1 |
| Flame resistance (UL 2.5 mm t) | | V-0 | V-0 | V-0 | V-0 | V-0 | V-0 |
| Maximum tensile strength | MPa | 52 | 48 | 50 | 46 | 44 | 44 |
| Young's modulus | MPa | 4200 | 4200 | 4200 | 4100 | 4000 | 4000 |
| Flexural strength | MPa | 72 | 72 | 72 | 70 | 71 | 70 |
| Flexural modulus | MPa | 3500 | 3400 | 3400 | 3300 | 3200 | 3200 |

Examples 26-30, Comparative Example 17

Examples 26-30 and Comparative Example 17 were prepared in the same manner as Example 15 except the polytetrafluoroethylene resin was not used, and the amounts of potassium nonafluorobutane sulfonate, potassium trifluoromethane sulfonic acid, and 18-crown-6 ether were those shown in Table 8.

The evaluation results are shown in Table 8.

Tables 4-8 above clearly show that the glass fiber-reinforced polycarbonate resin composition comprising (B) a metal salt of an organic sulfonic acid and (C) a compound with inclusion capability has excellent flame resistance, and also excellent maximum tensile strength, Young's modulus, flexural strength, and flexural modulus.

Meanwhile, in the comparative examples that do not comprise (C) a compound with inclusion capability, it is clear that although the flame resistance is on the same level, the maxi-

TABLE 8

|  |  | Examples | | | | | Comp. Ex. |
|---|---|---|---|---|---|---|---|
|  |  | 26 | 27 | 28 | 29 | 30 | 17 |
| PC(A4) | Parts by mass | 70 | 70 | 70 | 70 | 70 | 70 |
| GF | Parts by mass | 30 | 30 | 30 | 30 | 30 | 30 |
| $C_4F_9SO_3K$/18-crown-6-ether (equimolar) | Content of metal salt of organic sulfonic acid/ compound with inclusion capability (parts by mass) | 0.075/ 0.0586 | 0.12/ 0.0938 | | | | |
| $C_4F_9SO_3K$/18-crown-6-ether (molar ratio 1/0.5) | | | | 0.075/ 0.0293 | 0.12/ 0.0469 | | |
| $CF_3SO_3K$/18-crown-6-ether (equimolar) | | | | | | 0.085/ 0.120 | |
| $C_4F_9SO_3K$ | Parts by mass | | | | | | |
| $CF_3SO_3K$ | Parts by mass | | | | | | |
| PTFE | Parts by mass | | | | | | |
| Flame resistance (UL 2.5 mm t) | | V-2 | V-2 | V-2 | V-2 | V-2 | NG |
| Maximum tensile strength | MPa | 79 | 78 | 73 | 71 | 79 | 81 |
| Young's modulus | MPa | 8300 | 8300 | 8100 | 8000 | 8100 | 8300 |
| Flexural strength | MPa | 109 | 115 | 107 | 107 | 112 | 115 |
| Flexural modulus | MPa | 8100 | 8100 | 7900 | 7800 | 8000 | 8100 |

Comp. Ex.: Comparative Example mum tensile strength, Young's modulus, flexural strength, and flexural modulus are poor compared with the items in the examples.

Examples 31-34 and Comparative Examples 18-19

The following ingredients were used in Examples 31-34 and Comparative Examples 18-19.
(A) Polycarbonate Resin:
The above polycarbonate resin (PC(A4)) used in Example 15.
(F) Core/Shell Elastomer:
Paraloid™ EX2603 manufactured by Rohm and Haas Japan
(G) Fluoropolymer
Polyflon™ MPFA-500H polytetrafluoroethylene resin manufactured by Daikin Industries, Ltd.
Stabilizer 1: 2,2-methylene bis(4,6-di-tert-butylphenyl) octyl phosphite, ADK STAB HP-10™ manufactured by ADEKA Corp.
Stabilizer 2: octadecyl 3-(3,5-di-tert-butyl-4-hydroxyphenyl) propionate, ADK STAB™ AO-50 manufactured by ADEKA Corp.
Mold release agent 1: Stearic acid, NAA-180™ manufactured by NOF Corp.
Mold release agent 2: pentaerythritol distearate, UNISTER™ H-476DP manufactured by NOF Corp.

Example 31

Production of Resin Composition Pellets

First 0.08 parts by mass of potassium nonafluorobutane sulfonate ($C_4F_9SO_3K$) and 0.0625 parts by mass of 18-crown-6-ether (i.e., equimolar amounts of potassium nonafluorobutane sulfonate and 18-crown-6-ether) were added to 1 part by mass of water, dissolved by heating at 95° C. and stirring for 20 min, and then let stand to cool to 25° C. and mixed by stirring to prepare a homogenous aqueous solution. Except for the potassium nonafluorobutane sulfonate and 18-crown-6-ether, the other starting materials listed in Table 9 were mixed to uniformity with the above homogenous aqueous solution to prepare a flake starting material, which was then melted and kneaded as described below.

The above flake starting material was fed into a single-vent twin screw extruder (TOSHIBA MACHINE Co., model TEM37BS) equipped with a main starting material inlet port and a die at a rate of 50.5 kg/hr and kneaded at a screw speed of 400 rpm, extrusion speed of 50 kg/hr, and a barrel temperature of 280° C. Then the molten resin was extruded as a strand, rapidly cooled in a water tank, and made into pellets using a pelletizer to obtain pellets of the polycarbonate resin composition.
[Flame Resistance Evaluation (UL 1.5 mm t)]
After the resulting pellets were dried for 6 hr at 120° C., injection molding was performed using an injection molding machine model J50 manufactured by Japan Steel Works, Ltd. at a mold temperature of 80° C. and a cylinder temperature setting of 290° C. to obtain 125 mm long, 13 mm wide, and 1.5 mm thick test pieces for combustion testing.

A vertical combustion test in accordance with UL standard 94V was performed on the resulting combustion test pieces, and the results were assigned a value of V-0, V-1, or V2 from best to worst. Items outside these standards were classified as NG (no good).

[Charpy Impact Strength (Notched)]
After the resulting pellets were dried for 5 hr at 80° C., injection molding was performed and ISO multipurpose test pieces (thickness: 3 mm) were produced using a model Cycap M-2 injection molding machine (mold clamping force 75 t) manufactured by Sumitomo Heavy Industries at a cylinder temperature of 280° C. and a mold temperature of 80° C.

A V-notch (R=0.25) was placed in the resulting ISO multipurpose test pieces (thickness: 3 mm) in accordance with ISO 179, and the notched Charpy impact strength was measured at 23° C. (units: $kJ/m^2$).
[Color Tone of Molded Article (Thickness: 3 mm)]
After the resulting pellets were dried for 5 hr at 80° C., injection molding was performed and plate-shaped test pieces (65 mm long, 45 mm wide, and 3 mm thick) were produced using a model Cycap M-2 injection molding machine (mold clamping force 75 t) manufactured by Sumitomo Heavy Industries at a cylinder temperature of 280° C. and a mold temperature of 80° C.

The L value, a value, b value, and YI value of plate-shaped test pieces obtained by the above method were measured by reflection in accordance with JIS-K7105 using a model SE2000 spectral colorimeter (NIPPON DENSHOKU Industries Co.).

The above evaluation results are shown in Table 9.

Example 32

Example 32 was prepared in the same manner as Example 31 except the amounts of the potassium nonafluorobutane sulfonate and 18-crown-6-ether were changed to the amounts shown in Table 9 (corresponding to equimolar amounts of potassium nonafluorobutane sulfonate and 18-crown-6 ether). The evaluation results are shown in Table 9.

Example 33

Example 33 was prepared in the same manner as Example 31 except the amounts of the potassium nonafluorobutane sulfonate and 18-crown-6-ether were changed to the amounts shown in Table 9 (corresponding to 50 mol % of 18-crown-6 ether in relation to the potassium nonafluorobutane sulfonate). The evaluation results are shown in Table 9.

Example 34

Example 33 was prepared in the same manner as Example 31 except the amount of the 18-crown-6-ether was changed to that shown in Table 9 (corresponding to 50 mol % of 18-crown-6 ether in relation to the potassium nonafluorobutane sulfonate). The evaluation results are shown in Table 9.

Comparative Examples 18-19

Comparative Examples 18-19 were prepared in the same manner as Example 31 except the 18-crown-6-ether was not used and the amounts of potassium nonafluorobutane sulfonate ($C_4F_9SO_3K$) shown in Table 9 were used.

The evaluation results are shown in Table 9.

TABLE 9

|  |  | Examples | | | | Comparative Examples | |
| --- | --- | --- | --- | --- | --- | --- | --- |
|  |  | 31 | 32 | 33 | 34 | 18 | 19 |
| PC(A4) | Parts by mass | 100 | 100 | 100 | 100 | 100 | 100 |
| Core/shell elastomer | Parts by mass | 2 | 2 | 2 | 2 | 2 | 2 |
| $C_4F_9SO_3K$/18-crown-6-ether (equimolar) | Content of metal salt of organic sulfonic acid/ compound with inclusion capability (parts by mass) | 0.08/ 0.0625 | 0.12/ 0.0938 |  |  |  |  |
| $C_4F_9SO_3K$/18-crown-6-ether (molar ratio 1/0.5) |  |  |  | 0.08/ 0.0312 | 0.12/ 0.0469 |  |  |
| $C_4F_9SO_3K$ |  |  |  |  |  | 0.08 | 0.12 |
| Polyfluoropolymer | Parts by mass | 0.4 | 0.4 | 0.4 | 0.4 | 0.4 | 0.4 |
| Stabilizer 1 | Parts by mass | 0.05 | 0.05 | 0.05 | 0.05 | 0.05 | 0.05 |
| Stabilizer 2 | Parts by mass | 0.1 | 0.1 | 0.1 | 0.1 | 0.1 | 0.1 |
| Mold release agent 1 | Parts by mass | 0.08 | 0.08 | 0.08 | 0.08 | 0.08 | 0.08 |
| Mold release agent 2 | Parts by mass | 0.08 | 0.08 | 0.08 | 0.08 | 0.08 | 0.08 |
| Flame resistance (UL 1.5 mm t) |  | V-0 | V-0 | V-0 | V-0 | V-0 | V-0 |
| Charpy impact strength (notched) | $KJ/m^2$ | 19 | 19 | 19 | 19 | 18 | 18 |
| Color tone of molded article (thickness: 3 mm) |  |  |  |  |  |  |  |
| L value |  | 84.82 | 85.37 | 84.84 | 85.33 | 84.51 | 84.64 |
| a value |  | −1.21 | −1.24 | −1.33 | −1.26 | −1.57 | −1.39 |
| b value |  | −0.95 | −0.89 | −0.41 | −0.66 | 0.43 | −0.36 |
| YI value |  | −2.81 | −2.69 | −1.77 | −2.25 | −0.22 | −1.71 |

Table 9 clearly shows that the polycarbonate resin composition comprising (B) a metal salt of an organic sulfonic acid and (C) a compound with inclusion capability has a low b value, the emergence of yellowing is conspicuously reduced, the a value is low and redness is low, so the color tone is excellent, and the flame resistance and impact resistance are superb.

Meanwhile, it is clear that the color tone is poor in the comparative examples that do not contain (C) a compound with inclusion capability.

INDUSTRIAL APPLICABILITY

The flame retardant polycarbonate resin composition and flame retardant of the present invention provide excellent flame resistance and compatibility, so there are no clouding problems in the molded article, and the haze value is superb. Therefore, the present invention can be most suitably utilized in various polycarbonate resin molded articles wherein a high level of flame resistance and excellent haze properties are required, so it has outstanding industrial applicability.

More specifically, when the haze value is too great, if a molded piece having a thick section is extrusion molded, pronounced clouding occurs in the thick section, and in many cases the polycarbonate resin composition cannot be used for transparent goods. According to the polycarbonate resin composition of the present invention, the haze value in the thick section can be markedly lowered while maintaining a high level of flame resistance, and this flame resistance technology greatly broadens the fields of application for flame retardant polycarbonate resins, making it extremely useful. In addition, by using the polycarbonate resin composition of the present invention it is possible to obtain products with excellent color tone, making it extremely useful.

Moreover, the loss in rigidity and strength is reduced in the flame retardant polycarbonate resin composition of the present invention that is reinforced with glass fibers, and because it has excellent flame resistance, as well as excellent rigidity and strength, it can be most suitably utilized in a variety of polycarbonate resin molded articles requiring high levels of both flame resistance and strength.

Furthermore, the flame retardant polycarbonate resin composition of the present invention that contains a core/shell elastomer has excellent rigidity and strength, and can be most suitably utilized in polycarbonate resin molded articles requiring a high level of both flame resistance and strength.

The invention claimed is:

1. A flame retardant polycarbonate resin composition, comprising (A) a polycarbonate, (B) a metal salt of an organic sulfonic acid and (C) at least one crown ether compound selected from the group consisting of 18-crown-6-ethers, dibenzo-18-crown-6-ethers, and 15-crown-5-ethers.

2. The flame retardant polycarbonate resin composition according to claim 1, wherein at least one part of (C) encloses at least one part of (B) to form (D) an inclusion compound.

3. The flame retardant polycarbonate resin composition according to claim 1, wherein the content of (B) the content of (C) is each 0.01-2 parts by mass with respect to 100 parts by mass of (A).

4. The flame retardant polycarbonate resin composition according to claim 1, wherein (B)/(C), which is a molar ratio of (B) to (C), is 10/1-1/10.

5. The flame retardant polycarbonate resin composition according to claim 2, wherein (C) is 18-crown-6-ether.

6. The flame retardant polycarbonate resin composition according to claim 2, wherein (C) is dibenzo-18-crown-6-ether.

7. The flame retardant polycarbonate resin composition according to claim 1, wherein (B) is an alkali metal salt of a perfluoroalkane sulfonic acid or an alkali metal salt of an aromatic sulfonic acid.

8. The flame retardant polycarbonate resin composition according to claim 1, wherein (B) and (C) are dissolved and mixed together in a solvent before being mixed with (A).

9. The flame retardant polycarbonate resin composition according to claim 1, further comprising (E) glass fibers at 3-80 parts by mass with respect to 100 parts by mass of (A).

10. The flame retardant polycarbonate resin composition according to claim 1, further comprising (E) glass fibers at 3-80 parts by mass and further comprising (G) a fluoropolymer at 0.001-1 part by mass, both with respect to 100 parts by mass of (A).

11. The flame retardant polycarbonate resin composition according to claim 1, further comprising (F) a core/shell elastomer and further comprising (G) a fluoropolymer.

12. An inclusion compound in which (B) a metal salt of an organic sulfonic acid is enclosed by (C) a crown ether compound selected from the group consisting of 18-crown-6-ethers, dibenzo-18-crown-6-ethers, and 15-crown-5-ethers.

13. The inclusion compound according to claim 12, wherein (C) is 18-crown-6-ether.

14. The inclusion compound according to claim 12, wherein (C) is dibenzo-18-crown-6-ether.

15. The inclusion compound according to claim 12, wherein (C) is 15-crown-5-ether.

16. The flame retardant polycarbonate resin composition according to claim 2, wherein (C) is 15-crown-5-ether.

17. The flame retardant polycarbonate resin composition according to claim 1, wherein (B) is at least one selected from the group consisting of a metal salt of a fluorine-containing aliphatic sulfonic acid, a metal salt of a fluorine-containing aliphatic sulfonic acid imide, a metal salt of an aromatic sulfonic acid, and a metal salt of an aromatic sulfonamide.

18. The flame retardant polycarbonate resin composition according to claim 2, wherein (B) is at least one selected from the group consisting of a metal salt of a fluorine-containing aliphatic sulfonic acid, a metal salt of a fluorine-containing aliphatic sulfonic acid imide, a metal salt of an aromatic sulfonic acid, and a metal salt of an aromatic sulfonamide.

19. The inclusion compound according to claim 12, wherein, wherein (B) is at least one selected from the group consisting of a metal salt of a fluorine-containing aliphatic sulfonic acid, a metal salt of a fluorine-containing aliphatic sulfonic acid imide, a metal salt of an aromatic sulfonic acid, and a metal salt of an aromatic sulfonamide.

* * * * *

UNITED STATES PATENT AND TRADEMARK OFFICE
CERTIFICATE OF CORRECTION

| | | |
|---|---|---|
| PATENT NO. | : 9,115,269 B2 | Page 1 of 1 |
| APPLICATION NO. | : 13/988424 | |
| DATED | : August 25, 2015 | |
| INVENTOR(S) | : Takayasu Fujimori | |

It is certified that error appears in the above-identified patent and that said Letters Patent is hereby corrected as shown below:

On the title page, Item (22), PCT filing date is incorrect. Item (22) should read:

--(22)   PCT Filed: Nov. 29, 2011--

Signed and Sealed this
Twelfth Day of January, 2016

Michelle K. Lee
*Director of the United States Patent and Trademark Office*